US012071600B2

(12) United States Patent
Asirvatham

(10) Patent No.: US 12,071,600 B2
(45) **Date of Patent: *Aug. 27, 2024**

(54) SURFACTANTS FOR CLEANING PRODUCTS

(71) Applicant: AdvanSix Resins & Chemicals LLC, Parsippany, NJ (US)

(72) Inventor: Edward Asirvatham, Chatham, NJ (US)

(73) Assignee: AdvanSix Resins & Chemicals LLC, Parsippany, NJ (US)

( * ) Notice: Subject to any disclaimer, the term of this patent is extended or adjusted under 35 U.S.C. 154(b) by 706 days.

This patent is subject to a terminal disclaimer.

(21) Appl. No.: 17/196,856

(22) Filed: Mar. 9, 2021

(65) Prior Publication Data

US 2021/0284936 A1 Sep. 16, 2021

Related U.S. Application Data

(60) Provisional application No. 62/988,211, filed on Mar. 11, 2020.

(51) Int. Cl.

*C11D 1/10* (2006.01)
*C11D 1/52* (2006.01)
*C11D 3/32* (2006.01)
*C11D 3/43* (2006.01)
*C11D 10/04* (2006.01)
*C11D 17/00* (2006.01)

(52) U.S. Cl.

CPC .......... *C11D 10/047* (2013.01); *C11D 10/045* (2013.01); *C11D 17/0004* (2013.01); *C11D 2111/12* (2024.01)

(58) Field of Classification Search

None

See application file for complete search history.

(56) References Cited

U.S. PATENT DOCUMENTS

| | | | |
|---|---|---|---|
| 3,213,500 | A | 10/1965 | Thompson |
| 3,704,486 | A | 12/1972 | Blacklock |
| 4,276,460 | A | 6/1981 | Haesly et al. |
| 4,297,769 | A | 11/1981 | Coules |
| 4,502,193 | A | 3/1985 | Harmon et al. |
| 4,664,458 | A | 5/1987 | Worth |
| 5,060,100 | A | 10/1991 | Mihara et al. |
| 5,223,179 | A | 6/1993 | Connor et al. |
| 5,580,203 | A | 12/1996 | Read et al. |
| 5,706,559 | A | 1/1998 | Oliver et al. |
| 5,798,095 | A | 8/1998 | Racky |
| 5,958,894 | A | 9/1999 | Heath et al. |
| 5,972,323 | A | 10/1999 | Lang et al. |
| 6,114,757 | A | 9/2000 | Delprete |
| 6,304,986 | B1 | 10/2001 | Ma et al. |
| 6,501,030 | B1 | 12/2002 | Parizi et al. |
| 6,702,592 | B1 | 3/2004 | Harden et al. |
| 7,646,556 | B1 | 1/2010 | Kose et al. |
| 7,653,847 | B1 | 1/2010 | Liikanen et al. |
| 7,768,736 | B2 | 8/2010 | Belmont et al. |
| 8,599,507 | B2 | 12/2013 | Sanvido et al. |
| 8,964,320 | B1 | 2/2015 | Hu et al. |
| 9,142,246 | B1 | 9/2015 | Trantham et al. |
| 9,484,059 | B2 | 11/2016 | Lim et al. |
| 9,552,846 | B1 | 1/2017 | Lim |
| 2003/0081357 | A1 | 5/2003 | Hong et al. |
| 2008/0259100 | A1 | 10/2008 | Rengaswamy et al. |
| 2013/0336903 | A1* | 12/2013 | Fernandez Prieto ........................ A61K 8/4926 424/59 |
| 2015/0086491 | A1 | 3/2015 | Subkowski et al. |
| 2017/0079898 | A1 | 3/2017 | Fevola et al. |
| 2017/0081277 | A1 | 3/2017 | Boaz et al. |
| 2019/0010426 | A1 | 1/2019 | Scialla et al. |
| 2021/0229053 | A1 | 7/2021 | Asirvatham et al. |
| 2021/0230100 | A1 | 7/2021 | Asirvatham et al. |
| 2021/0230106 | A1 | 7/2021 | Asirvatham et al. |
| 2021/0230107 | A1 | 7/2021 | Asirvatham et al. |
| 2021/0230108 | A1 | 7/2021 | Asirvatham et al. |
| 2021/0283030 | A1 | 9/2021 | Asirvatham |
| 2021/0284896 | A1 | 9/2021 | Asirvatham |
| 2021/0289776 | A1 | 9/2021 | Asirvatham |
| 2021/0290765 | A1 | 9/2021 | Asirvatham |

(Continued)

FOREIGN PATENT DOCUMENTS

| | | | |
|---|---|---|---|
| CN | 1078994 | A | 12/1993 |
| CN | 1340096 | A | 3/2002 |
| CN | 103221030 | A | 7/2013 |

(Continued)

OTHER PUBLICATIONS

Hrabalek et al., "Esters of omega-amino acids as flexible penetration enhancers", Pharmazie, vol. 49, No. 5, May 1994, pp. 325-328.

International Search Report and Written Opinion received for PCT Patent Application No. PCT/US2021/021565, mailed on Jun. 18, 2021, 13 pages.

International Search Report and Written Opinion received for PCT Patent Application No. PCT/US2021/021569, mailed on May 17, 2021, 9 pages.

International Search Report and Written Opinion received for PCT Patent Application No. PCT/US21/21571, mailed on Jul. 9, 2021, 9 pages.

International Search Report and Written Opinion received for PCT Patent Application No. PCT/US21/21574, mailed on Jul. 1, 2021, 10 pages.

International Search Report and Written Opinion received for PCT Patent Application No. PCT/US21/21595, mailed on Jul. 30, 2021, 15 pages.

International Search Report and Written Opinion received for PCT Patent Application No. PCT/US21/21596, mailed on Jun. 22, 2021, 10 pages.

(Continued)

*Primary Examiner* — Lorna M Douyon

(74) *Attorney, Agent, or Firm* — Faegre Drinker Biddle & Reath LLP

(57) ABSTRACT

The present disclosure pertains to surfactants for use in the formulation of detergents, foaming agents, emulsifiers, and degreasers. Some aspects of the invention include formulations suitable for cleaning and/or condition fabrics including upholstery. Some formulations are suitable for in home or commercial dry cleaning. Some of the formulations may be suitable for cleaning hard surfaces including plastic surfaces.

15 Claims, 10 Drawing Sheets

(56) References Cited

U.S. PATENT DOCUMENTS

| | | | |
|---|---|---|---|
| 2021/0292583 | A1 | 9/2021 | Asirvatham |
| 2021/0292647 | A1 | 9/2021 | Asirvatham |

FOREIGN PATENT DOCUMENTS

| | | | | |
|---|---|---|---|---|
| CN | 105802600 A | 7/2016 | | |
| CN | 108024935 A | 5/2018 | | |
| DE | 3939746 A1 | 6/1991 | | |
| DE | 29622184 U1 | 2/1997 | | |
| EP | 0638236 A1 | 2/1995 | | |
| EP | 0826661 A2 | 3/1998 | | |
| EP | 0883600 B1 | 10/2001 | | |
| GB | 2204740 A | 11/1988 | | |
| GB | 2311033 A | 9/1997 | | |
| JP | 49-076818 A | 7/1974 | | |
| JP | 61-278341 A | 12/1986 | | |
| JP | 04-349284 A | 12/1992 | | |
| JP | 08-007556 A | 1/1996 | | |
| JP | 09-266021 A | 10/1997 | | |
| JP | 11-233910 A | 8/1999 | | |
| JP | 2000-502718 A | 3/2000 | | |
| JP | 2006-294170 A | 10/2006 | | |
| JP | 2009-108057 A | 5/2009 | | |
| JP | 2013-511270 A | 4/2013 | | |
| JP | 2017-195029 A | 10/2017 | | |
| WO | WO-9731889 A1 * | 9/1997 | ........... | C07C 219/06 |
| WO | 98/45233 A2 | 10/1998 | | |
| WO | 00/42155 A1 | 7/2000 | | |
| WO | 03/68377 A1 | 8/2003 | | |
| WO | 2012/061093 A1 | 5/2012 | | |
| WO | 2017/012087 A1 | 1/2017 | | |
| WO | 2017/048555 A1 | 3/2017 | | |
| WO | 2017/199921 A1 | 11/2017 | | |
| WO | 2018/115191 A1 | 6/2018 | | |

OTHER PUBLICATIONS

International Search Report and Written Opinion received for PCT Patent Application No. PCT/US21/21597, mailed on Aug. 9, 2021, 11 pages.

Invitation to Pay Additional Fees received for PCT Patent Application No. PCT/US21/21595, mailed on Jun. 9, 2021, 9 pages.

Invitation to Pay Additional Fees received for PCT Patent Application No. PCT/US21/21597, mailed on Jun. 17, 2021, 7 pages.

Kerry P. Mahon et al: "Combinatorial Approach to Determine Functional Group Effects on Lipidoid-Mediated si RNA Delivery", Bioconjugate Chemistry, vol. 21, No. 8, Aug. 18, 2010 (Aug. 18, 2010), pp. 1448-1454.

International Search Report and Written Opinion received for PCT Patent Application No. PCT/US2021/014440, mailed on Apr. 30, 2021, 9 pages.

International Search Report and Written Opinion received for PCT Patent Application No. PCT/US2021/014444, mailed on Apr. 26, 2021, 12 pages.

International Search Report and Written Opinion received for PCT Patent Application No. PCT/US2021/014445, mailed on Apr. 26, 2021, 9 pages.

International Search Report and Written Opinion received for PCT Patent Application No. PCT/US2021/014447, mailed on Apr. 30, 2021, 9 pages.

International Search Report and Written Opinion received for PCT Patent Application No. PCT/US2021/014457, mailed on Apr. 30, 2021, 8 pages.

Novotny et al., "Transkarbams as transdermal permeation enhancers: effects of ester position and ammonium carbamate formation", Bioorganic & medicinal chemistry letters, vol. 20, No. 9, May 1, 2010, pp. 2726-2728.

Yasa et al., "Synthesis, characterization, antimicrobial and biofilm inhibitory activities of new N-oxide esters", Medicinal Chemistry Research, vol. 26, No. 8, Apr. 3, 2017, pp. 1689-1696.

* cited by examiner

SURFACTANTS FOR CLEANING PRODUCTS

CROSS-REFERENCE TO RELATED APPLICATION

This application claims priority to Provisional Application No. 62/988,211, filed Mar. 11, 2020, which is herein incorporated by reference in its entirety.

FIELD

The present disclosure pertains to surfactants for use in cleaning products including cleaning products used to clean and conditioning fabrics, hard surfaces, and plastic surfaces. Such surfactants may include derivatives of amino acids wherein the derivatives have surface-active properties.

BACKGROUND

Surfactants (molecules with surface-active properties) are widely used in commercial applications in formulations ranging from detergents to hair care products to cosmetics. Compounds with surface-active properties are used as soaps, detergents, lubricants, wetting agents, foaming agents, and spreading agents, among others. In personal care cleansing products (e.g., shampoos, body washes, facial cleansers, liquid hand soaps, etc.) the surfactant is often the most important component because it provides many of the cleansing attributes of the composition.

Surfactants may be uncharged, zwitterionic, cationic, or anionic. Although in principle any surfactant class (e.g., cationic, anionic, nonionic, amphoteric) is suitable in cleansing or cleaning applications, in practice many personal care cleansers and household cleaning products are formulated with a combination of two or more surfactants from two or more surfactant classes.

Often, surfactants are amphiphilic molecules with a relatively water-insoluble hydrophobic "tail" group and a relatively water-soluble hydrophilic "head" group. These compounds may adsorb at an interface, such as an interface between two liquids, a liquid and a gas, or a liquid and a solid. In systems comprising relatively polar and relatively non-polar components the hydrophobic tail preferentially interacts with the relatively non-polar component(s) while the hydrophilic head preferentially interacts with the relatively polar component(s). In the case of an interface between water and oil, the hydrophilic head group preferentially extends into the water, while the hydrophobic tail preferentially extends into the oil. When added to a water-gas only interface, the hydrophilic head group preferentially extends into the water, while the hydrophobic tail preferentially extends into the air. The presence of the surfactant disrupts at least some of the intermolecular interaction between the water molecules, replacing at least some of the interactions between water molecules with generally weaker interactions between at least some of the water molecules and the surfactant. This results in lowered surface tension and can also serve to stabilize the interface.

At sufficiently high concentrations, surfactants may form aggregates which serve to limit the exposure of the hydrophobic tail to the polar solvent. One such aggregate is a micelle. In a typical micelle the molecules are arranged in a sphere with the hydrophobic tails of the surfactant(s) preferentially located inside the sphere and the hydrophilic heads of the surfactant(s) preferentially located on the outside of the micelle where the heads preferentially interact with the more polar solvent. The effect that a given compound has on surface tension and the concentration at which it forms micelles may serve as defining characteristics for a surfactant.

SUMMARY

The present disclosure provides compositions for cleaning and or degreasing hard and plastic surfaces such as floors, walls, ceilings, roofs, counter tops, furniture, plates, cups, glasses, cutlery, eating utensils, machinery, part of machines, and devices used in the preparation and/or the packing of food; fabric care formulations, including laundry detergents, spot removers, wash pretreatments, fabric softeners, fabric dyes, and bleaching agents; and compositions used to clean upholstery and carpets. Some inventive compositions may be in the form of detergents, emulsifiers, dispersants, foaming agents and combinations thereof. The inventive products may be formulated to include one or more surfactants, from one or more surfactant classes.

The present disclosure provides derivatives of amino acids that have surface-active properties. The amino acids may be naturally occurring or synthetic amino acids, or they may be obtained via ring-opening reactions of molecules such as lactams, for instance caprolactam. The amino acids may be functionalized to form compounds with surface-active properties. Characteristically, these compounds may have low critical micelle concentrations (CMC) and/or the ability to reduce the surface tension of a liquid.

The present disclosure provides a formulation for water based cleaning products, comprising at least one surfactant or co-surfactant of Formula I, Formula I

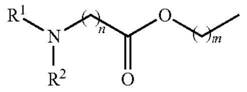

wherein $R^1$ and $R^2$ may be the same or different, and may be selected from the group consisting of hydrogen and $C_1$-$C_6$ alkyl, wherein the $C_1$-$C_6$ alkyl may optionally be substituted with one or more substituents selected from the group consisting of hydroxyl, amino, amido, sulfonyl, sulfonate, carbonyl, carboxyl, and carboxylate; n is an integer from 2 to 5 (including 2 and 5); m is an integer from 9 to 20 (including 9 and 20); the terminal nitrogen is optionally further substituted with $R^3$, wherein $R^3$ is selected from the group consisting of hydrogen, oxygen, hydroxyl, and $C_1$-$C_6$ alkyl, wherein the $C_1$-$C_6$ alkyl may optionally be substituted with one or more substituents selected from the group consisting of hydroxyl, amino, amido, sulfonyl, sulfonate, carbonyl, carboxyl, and carboxylate; an optional counterion associated with the compound which, if present, is selected from the group consisting of chloride, bromide, iodide, and hydroxide; and one or more soaps, which themselves may be characterized as surfactants, soaps may also include fatty acids, salts, some soaps may comprise both water soluble and fat-soluble moieties.

The present disclosure provides a formulation for laundry detergent, comprising at least one surfactant or co-surfactant of Formula I, Formula I

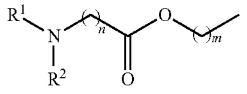

wherein $R^1$ and $R^2$ may be the same or different, and may be selected from the group consisting of hydrogen and $C_1$-$C_6$ alkyl, wherein the $C_1$-$C_6$ alkyl may optionally be substituted with one or more substituents selected from the group consisting of hydroxyl, amino, amido, sulfonyl, sulfonate, carbonyl, carboxyl, and carboxylate; n is an integer from 2 to 5 (including 2 and 5); m is an integer from 9 to 20 (including 9 and 20); the terminal nitrogen is optionally further substituted with $R^3$, wherein $R^3$ is selected from the group consisting of hydrogen, oxygen, hydroxyl, and $C_1$-$C_6$ alkyl, wherein the $C_1$-$C_6$ alkyl may optionally be substituted with one or more substituents selected from the group consisting of hydroxyl, amino, amido, sulfonyl, sulfonate, carbonyl, carboxyl, and carboxylate; an optional counterion associated with the compound which, if present, is selected from the group consisting of chloride, bromide, iodide, and hydroxide; and at least one builder, builders may include molecules that facilitate the efficacy of the cleaning action in aqueous environments, some useful builder include, but are not limited to, certain polymers, phosphates and aluminosciliates, calcium citrates, alkaline metal salts, sodium salts, some grades of Zeolite.

The present disclosure provides a formulation for bleaching products, comprising at least one surfactant or co-surfactant of Formula I, Formula I

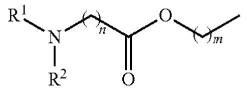

wherein $R^1$ and $R^2$ may be the same or different, and may be selected from the group consisting of hydrogen and $C_1$-$C_6$ alkyl, wherein the $C_1$-$C_6$ alkyl may optionally be substituted with one or more substituents selected from the group consisting of hydroxyl, amino, amido, sulfonyl, sulfonate, carbonyl, carboxyl, and carboxylate; n is an integer from 2 to 5 (including 2 and 5); m is an integer from 9 to 20 (including 9 and 20); the terminal nitrogen is optionally further substituted with $R^3$, wherein $R^3$ is selected from the group consisting of hydrogen, oxygen, hydroxyl, and $C_1$-$C_6$ alkyl, wherein the $C_1$-$C_6$ alkyl may optionally be substituted with one or more substituents selected from the group consisting of hydroxyl, amino, amido, sulfonyl, sulfonate, carbonyl, carboxyl, and carboxylate; an optional counterion associated with the compound which, if present, is selected from the group consisting of chloride, bromide, iodide, and hydroxide; bleaches such as peroxy based beaches including, but not limited to inorganic persalts, organic peroxyacids, metal borates, percarbonates, perphosphates, persilicates, and persulfates.

The present disclosure provides formulations for use in dry cleaning, comprising at least one surfactant or co-surfactant of Formula I, Formula I

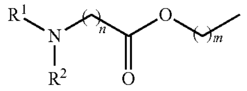

wherein $R^1$ and $R^2$ may be the same or different, and may be selected from the group consisting of hydrogen and $C_1$-$C_6$ alkyl, wherein the $C_1$-$C_6$ alkyl may optionally be substituted with one or more substituents selected from the group consisting of hydroxyl, amino, amido, sulfonyl, sulfonate, carbonyl, carboxyl, and carboxylate; n is an integer from 2 to 5 (including 2 and 5); m is an integer from 9 to 20 (including 9 and 20); the terminal nitrogen is optionally further substituted with $R^3$, wherein $R^3$ is selected from the group consisting of hydrogen, oxygen, hydroxyl, and $C_1$-$C_6$ alkyl, wherein the $C_1$-$C_6$ alkyl may optionally be substituted with one or more substituents selected from the group consisting of hydroxyl, amino, amido, sulfonyl, sulfonate, carbonyl, carboxyl, and carboxylate; an optional counterion associated with the compound which, if present, is selected from the group consisting of chloride, bromide, iodide, and hydroxide; solvents and optionally co-solvent preferable non-flammable oil immersible compositions for use in either or both home or commercial dry cleaning processes.

One specific compound provided by the present disclosure is 6-(dodecyloxy)-N,N,N-trimethyl-6-oxohexan-1-aminium iodide (Surfactant 1), having the following formula:

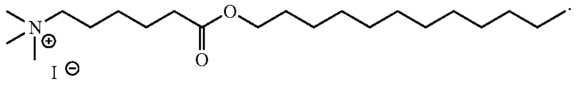 [SMILES: CCCCCCCCCCCCOC(=O)CCCCC[N+](C)(C)C ; [I-]]

A second specific compound provided by the present disclosure is dodecyl 6-(dimethylamino)hexanoate N-oxide (Surfactant 2), having the following formula:

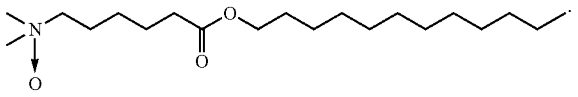 [SMILES: CCCCCCCCCCCCOC(=O)CCCCCN(C)C ; O]

In the structure above, the notation "N→O" is intended to convey a non-ionic bonding interaction between nitrogen and oxygen.

A third specific compound provided by the present disclosure is 6-(dodecyloxy)-N,N-dimethyl-6-oxohexan-1-aminium chloride (Surfactant 3), having the following formula:

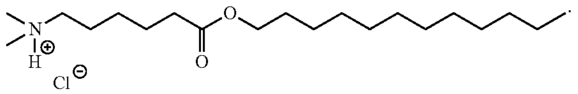

A fourth specific compound provided by the present disclosure is 4-((6-(dodecyloxy)-6-oxohexyl)dimethylammonio)butane-1-sulfonate (Surfactant 4), having the following formula:

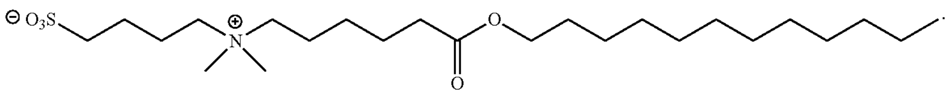

A fifth specific compound provided by the present disclosure is 6-(dodecyloxy)-6-oxohexan-1-aminium chloride (Surfactant 5), having the following formula:

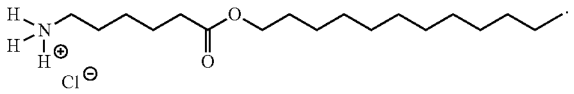

The above mentioned and other features of the disclosure, and the manner of attaining them, will become more apparent and will be better understood by reference to the following description of embodiments taken in conjunction with the accompanying drawings.

DETAILED DESCRIPTION

Figure 1:
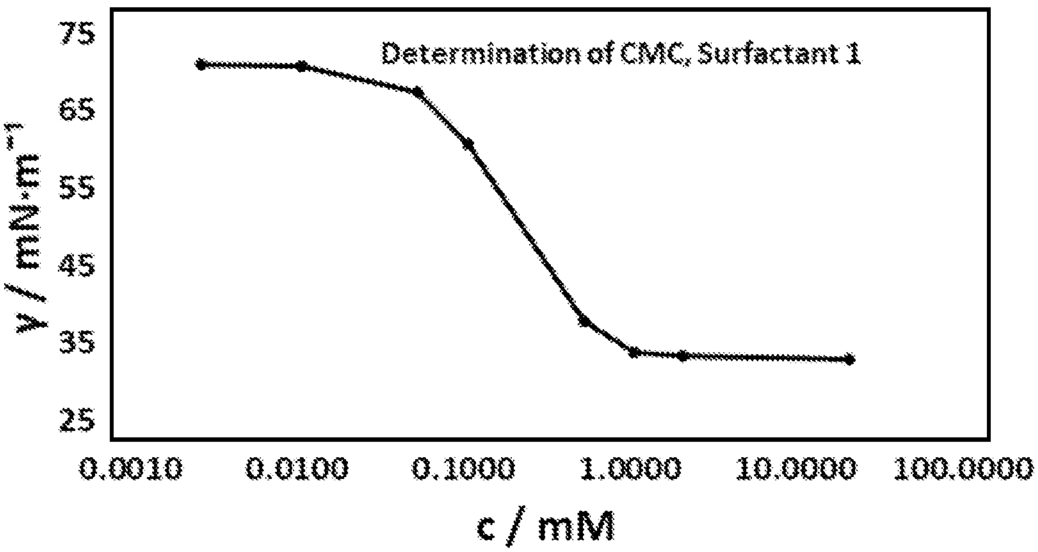
FIG. 1 shows a plot of surface tension versus concentration for Surfactant 1 measured at pH=7 as described in Example 1 b, wherein the Y axis depicts the surface tension (γ) in millinewtons per meter (mN/m) and the X axis depicts the concentration (c) in millimoles (mM).

As used herein, the phrase “within any range defined between any two of the foregoing values” literally means that any range may be selected from any two of the values listed prior to such phrase regardless of whether the values are in the lower part of the listing or in the higher part of the listing. For example, a pair of values may be selected from two lower values, two higher values, or a lower value and a higher value.

As used herein, the word “alkyl” means any saturated carbon chain, which may be a straight or branched chain.

As used herein, the phrase “surface-active” means that the associated compound is able to lower the surface tension of the medium in which it is at least partially dissolved, and/or the interfacial tension with other phases, and, accordingly, may be at least partially adsorbed at the liquid/vapor and/or other interfaces. The term “surfactant” may be applied to such a compound.

With respect to the terminology of inexactitude, the terms “about” and “approximately” may be used, interchangeably, to refer to a measurement that includes the stated measurement and that also includes any measurements that are reasonably close to the stated measurement. Measurements that are reasonably close to the stated measurement deviate from the stated measurement by a reasonably small amount as understood and readily ascertained by individuals having ordinary skill in the relevant arts. Such deviations may be attributable to measurement error or minor adjustments made to optimize performance, for example. In the event it is determined that individuals having ordinary skill in the relevant arts would not readily ascertain values for such reasonably small differences, the terms “about” and “approximately” can be understood to mean plus or minus 10% of the stated value.

Unless explicitly defined otherwise or implicitly used otherwise, ss used herein the term, “suds” indicates a non-equilibrium dispersion of gas bubbles in a relatively smaller volume of a liquid. The terms like “suds,” “foam,” and “lather” can be used interchangeably within the meaning of the present invention.

Unless explicitly defined otherwise or implicitly used otherwise, ss used herein the term, “sudsing profile” refers to the properties of a detergent composition relating to suds character during the wash and rinse cycles. The sudsing profile of a detergent composition includes, but is not limited to, the speed of suds generation upon dissolution in the laundering liquor, the volume and retention of suds in the wash cycle, and the volume and disappearance of suds in the rinse cycle. Preferably, the sudsing profile includes the Wash Suds Index and Rinse Suds Index, as specifically defined by the testing methods disclosed hereinafter in the examples. It may further include additional suds—related parameters, such as suds stability measured during the washing cycle and the like.

Unless explicitly defined otherwise or implicitly used otherwise, ss used herein the term, “fluid” includes liquid, gel, paste, and gas product forms.

Unless explicitly defined otherwise or implicitly used otherwise, ss used herein the term, “liquid” refers to a fluid having a liquid having a viscosity of from about 1 to about 2000 mPa*s at 25° C., and a shear rate of 20 sec-1.

Unless explicitly defined otherwise or implicitly used otherwise, as used herein the term, “dry cleaning composition” as used herein is intended to mean the composition used in the dry cleaning process including the dry cleaning solvent, any Surfactant, cleaning agents but excluding the laundry articles that are to be cleaned.

Unless explicitly defined otherwise or implicitly used otherwise, ss used herein the term, “organic dry cleaning solvent” as used herein is intended to mean any non-aqueous solvent that preferably has a liquid phase at 20° C. and standard pressure. The term organic has its usual meaning, i.e., a compound with at least one carbon hydrogen bond.

The present disclosure provides compositions for cleaning and/or degreasing hard and plastic surfaces such as floors, walls, ceilings, roofs, counter tops, furniture, plates, cups, glasses, cutlery, eating utensils, machinery, parts of machines, and devices used in the preparation and/or packing of food; fabric care formulations, including laundry detergents, spot removers, wash pretreatments, fabric softeners, fabric dyes, and bleaching agents; and compositions used to clean upholstery and carpets.

I. Water Based Cleaning Formulations

Laundry detergents, degreasers, spot removers, and laundry pretreatment compositions may comprise combinations of detersive surfactants, binders, enzymes, and conditioning agents. Laundry detergent formulations include, solids, liquids, powders, bars, sticks, pods, aerosols, and/or gels.

The laundry detergent compositions of the present invention can be used in applications such as automatic washing machine laundering, semi-automatic machine laundering (i.e., machine washing that requires at least one or two manual steps), hand washing, etc. In some embodiments the detergent composition is a designated for hand-washing laundry detergent product.

The laundry detergent compositions can be in any form, namely, in the form of a liquid; an emulsion; a paste; a gel; a spray or foam; a solid such as a powder, granules, agglomerate, tablet, pouches, and bar; types delivered in dual- or multi-compartment containers or pouches; pre moistened or dry wipes (i.e., a liquid detergent composition in combination with a nonwoven material or a powder detergent composition in combination with a nonwoven material) that can be activated with water by a consumer; and other homogeneous or multiphase consumer cleaning product forms.

Some of the fabric care formulations of the present invention comprise one or more surfactants, also referred to as the surfactant system. The surfactant system is included to provide cleaning performance to the composition. The surfactant system comprises at least one surfactant, which may be an amphoteric surfactant, a zwitterionic surfactant, a cationic surfactant, a nonionic surfactant, and optionally at least one other surfactant, which may be an amphoteric surfactant, a zwitterionic surfactant, a cationic surfactant, a nonionic surfactant, or a combination thereof. Such surfactants should be physically and chemically compatible with the essential components described herein, or should not otherwise unduly impair product stability, aesthetics, or performance.

The compositions of the invention may be of any suitable physical form, for example, particulates (powders, granules, tablets), liquids, pastes, gels or bars. Preferably the detergent composition is in granular form. The composition can be formulated for use as hand wash or machine wash detergents.

Representative, but not limiting, laundry detergent formulations may include the combination of a soap, an ionic surfactant, a nonionic surfactant, optionally a builder system, and optionally other detergent ingredients. Wherein a set amount of the soap is present in the form of granules which are dry-mixed with the other components, and the soap granule has a defined concentration of soap.

Some preferred detergent compositions according to the invention show improved dissolution properties across a range of water hardness.

1. Detergent and/or Soaps

Detergents include anionic, cationic, non-ionic, and zwitterionic detergents. Soaps include compound of the general formula: $(RCO_{2'})_n\ M^{n+}$ wherein R is an alkly group, and M is a metal, and $^{n+}$ is either +1 or +2, commonly the alkyl group may be portion of an fatty acid, M, may be sodium, lithium, magnesium, calcium, and the like.

The soap according to the invention may comprise from about 5 to 85 wt. %, preferably 7 to 60 wt. %, more preferably 10 to 35 wt. % of the formulation. The soap may in part comprise a surfactant system comprising from about 20 to 50 wt. % of a soap. Preferably the surfactant system comprises from 30 to 40 wt. % of a soap. In a preferred embodiment of the invention from 80 wt. % to 100 wt. %, preferably from 85 to 95 wt. % of the soap is present in the form of granules.

The laundry detergent compositions of the current invention may comprise a soap granule which has a concentration of soap of at least 75 wt. % based on the weight of the composition.

In some embodiments of the invention the soap granule has a concentration of soap of from 80 to 95 wt. %, preferably from 85 to 90 wt. %. Preferably the soap granules include more than 90 wt. % soap, less than 10 wt. % moisture and less than 1 wt. % sodium hydroxide.

Useful soap compounds include but are not limited to; the alkali metal soaps such as the sodium, potassium, ammonium and a substituted ammonium (for example, monoethanolamine) salts or any combinations of this, of higher fatty acids containing from about 8 to 24 carbon atoms.

In some embodiments of the invention the fatty acid soap has a carbon chain length of from $C_{10}$ to $C_{22}$, more preferably $C_{12}$ to $C_{20}$. Suitable fatty acids can be obtained from natural sources such as plant or animal esters e.g. palm oil, coconut oil, babassu oil, soybean oil, castor oil, rape seed oil, sunflower oil, cottonseed oil, tallow, fish oils, grease lard and mixtures thereof. Also, fatty acids can be produced by synthetic means such as the oxidation of petroleum, or hydrogenation of carbon monoxide by the Fischer-Tropsch process. Resin acids are suitable, such as rosin and those resin acids in tall oil. Naphthenic acids are also suitable. Sodium and potassium soaps can be made by direct saponification of the fats and oils or by the neutralization of the free fatty acids which are prepared in a separate manufacturing process. Particularly useful are the sodium and potassium salts and the mixtures of fatty acids derived from coconut oil and tallow, i.e. sodium tallow soap, sodium coconut soap, potassium tallow soap, potassium coconut soap.

In some embodiments of the invention the fatty acid soap is a lauric soap. For example, Prifac 5908 a fatty acid from Uniqema which was neutralized with caustic soda. This soap is an example of a fully hardened or saturated lauric soap, which in general is based on coconut or palm kernel oil.

Although not necessary, preferably the soap does not stand out from the rest of the ingredients. It therefore needs to be whitish, and more or less round, namely with an aspect ratio of less than 2. This ensures that the laundry powder in its final format is free-flowing and containing a soap granule means that it is congruent with the rest of the composition.

In one preferred embodiment the soap has a particle size of from 400 to 1400 um, preferably 500 to 1200 um.

In one preferred embodiment the soap granule has a bulk density of from 400 to 650 g/liter, and the bulk density of the fully formulated powders are from 400 to 900 g/liter. Fabric washing powders containing major quantities of soap are favored by some consumers because of good detergency, and the tendency to leave clothes feeling softer than those washed with powders based on synthetic detergent active compounds. Soap also has environmental advantages in that it is fully biodegradable, and is a natural material derived from renewable raw materials. Saturated sodium soaps have high Krafft temperatures and consequently dissolve poorly at low temperatures, which are applied by some consumers. It is well known that certain mixtures of saturated and unsaturated soaps have much lower Krafft temperatures. However, unsaturated soaps are less stable upon storage, and tend to be malodorous. The Soap mixture used in the granules therefore needs to be a careful balance between dissolution properties and stability proper ties. The stability of the soap is enhanced when it is concentrated in granules; compared to soap that is incorporated at low concentration into composite granules. The soap may be used in combination with a suitable antioxidant for example ethylenediamine tetra acetic acid and/or ethane-1-hydroxy-1,1-diphosphonic acid. Also, preservatives may be present to prevent degradation of the soap with can result in malodor or discoloration; for example, sodium hydroxyethlidene disphosphonic acid may be used.

2. Surfactants

Surfactant than can be used to practice aspects of the invention include the compounds of Formula I, Formula I

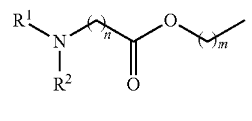

wherein $R^1$ and $R^2$ may be the same or different, and may be selected from the group consisting of hydrogen and $C_1$-$C_6$ alkyl, wherein the $C_1$-$C_6$ alkyl may optionally be substituted with one or more substituents selected from the group consisting of hydroxyl, amino, amido, sulfonyl, sulfonate, carbonyl, carboxyl, and carboxylate; n is an integer from 2 to 5 (including 2 and 5); m is an integer from 9 to 20 (including 9 and 20); the terminal nitrogen is optionally further substituted with $R^3$, wherein $R^3$ is selected from the group consisting of hydrogen, oxygen, hydroxyl, and $C_1$-$C_6$ alkyl, wherein the $C_1$-$C_6$ alkyl may optionally be substituted with one or more substituents selected from the group consisting of hydroxyl, amino, amido, sulfonyl, sulfonate, carbonyl, carboxyl, and carboxylate; an optional counterion associated with the compound which, if present, is selected from the group consisting of chloride, bromide, iodide, and hydroxide.

Anionic surfactants are well known to those skilled in the art. Examples include alkylbenzene sulfonates, particularly linear alkylbenzene sulfonates having an alkyl chain length of $C_8$-$C_{15}$, primary and secondary alkylsulfates, particularly $C_8$-$C_{20}$ primary alkyl Sulfates; alkyl ether sulfates; olefin sulfonates; alkyl xylene sulfonates; dialkyl sulpho succinates; and fatty acid ester sulfonates. Sodium salts are generally preferred. According to a preferred embodiment of the invention, the granular laundry detergent composition comprises an anionic surfactant which is a sulfonate anionic surfactant. According to an especially preferred embodiment, the sulfonate anionic surfactant comprises linear alkylbenzene sulfonate (LAS). In a preferred embodiment the anionic surfactant is present in an amount of from 15 to 50 wt. %. In a preferred embodiment the weight ratio of the anionic surfactant to soap is from 0.5:1 to 5:1, preferably 1:1 to 2:1.

Some nonionic surfactants are well suited for use in detergent formulations.

In some embodiments the nonionic surfactant is present in an amount of from 20 to 60 wt. %. Nonionic surfactants that may be used include the primary and secondary alcohol ethoxylates, especially the $C_8$-$C_{20}$ aliphatic alcohols ethoxylated with an average of from 1 to 20 moles of ethylene oxide per mole of alcohol, and more especially the $C_{10}$-$C_{15}$ primary and secondary aliphatic alcohols ethoxylated with an average of from 1 to 10 moles of ethylene oxide per mole of alcohol. Non-ethoxylated nonionic surfactants include alkylpolyglycosides, glycerol monoethers, and polyhydroxyamides (glucamide).

Examples of suitable nonionic surfactants include Neodol 255E from Shell, which is a $C_{12}$ to $C_{15}$ poly (1 to 6) ethoxylate with an average degree of ethoxylation of 5. Also suitable is Lutensol A7 a $C_{13}$ to $C_{15}$ ethoxylate from BASF, with an average degree of ethoxylation of 7. HLB values can be calculated according to the method given in Griffin, J. Soc. Cosmetic Chemists, 5 (1954) 249 256.

3. Builder

Builders may be added to detergent formulations to increase the cleaning properties of the detergent. Such compounds may function by at least one of the following actions; removing or sequestering divalent cations commonly present in water as $Ca^{2+}$ and/or $Mg^{2+}$; creating or contributing the creation of a alkaline environment; enhancing the performance of surfactants; and stabilizing the dispersion of soil in the wash liquor.

Commonly used builders include, but are not limited to, sodium tripolyphosphates, nitrilloacetic acid salts, and zeolites.

The compositions of the invention may contain a detergency builder. Preferably the builder is present in an amount of from 0 to 15 wt. % based on the weight of the total composition. Alternatively, the compositions may be essentially free of detergency builder.

The builder may be selected from strong builders such as phosphate builders, aluminosilicate builders and mixtures thereof. One or more weak builders such as calcite/carbonate, citrate or polymer builders may be additionally or alternatively present.

The phosphate builder (if present) may for example be selected from alkali metal, preferably sodium, pyrophosphate, orthophosphate and tripolyphosphate, and mixtures thereof.

The aluminosilicate (if present) may be, for example, selected from one or more crystalline and amorphous aluminosilicates, for example, zeolites as disclosed in GB 1 473 201 (Henkel), amorphous aluminosilicates as disclosed in GB 1 473 202 (Henkel) and mixed crystalline/amorphous aluminosilicates as disclosed in GB 1 470 250 (Procter & Gamble); and layered silicates as disclosed in EP 164514B (Hoechst).

The alkali metal aluminosilicate may be either crystalline or amorphous or mixtures thereof, having the general formula: 0.8-1.5 $Na_2O{\cdot}Al_2{\cdot}O_3{\cdot}0.8\text{-}6SiO_2$.

These materials may generally contain some bound water and are required to have a calcium ion exchange capacity of at least 50 mg CaO/g. The preferred sodium aluminosilicates contain 1.5-3.5 $SiO_2$, units (in the formula above). Both the amorphous and the crystalline materials can be prepared readily by reaction between sodium silicate and sodium aluminate, as amply described in the literature. Suitable crystalline sodium aluminosilicate ion-exchange detergency builders are described, for example, in GB 1429 143 (Procter & Gamble). The preferred sodium aluminosilicates of this type are the well-known commercially available Zeolites A and X, and mixtures thereof.

The zeolite may be the commercially available Zeolite 4A now widely used in laundry detergent powders. However, according to a preferred embodiment of the invention, the zeolite builder incorporated in the compositions of the invention is maximum aluminum zeolite P (zeolite MAP) as described and claimed in EP 384 070A (Unilever). Zeolite MAP is defined as an alkali metal aluminosilicate of the zeolite P type having a silicon to aluminum ratio not exceeding 1.33, preferably within the range of from 0.90 to 1.33, and more preferably within the range of from 0.90 to 1.20.

Suitable inorganic salts include alkaline agents such as alkali metal, preferably sodium, carbonates, Sulfates, silicates, metasilicates as independent salts or as double salts. The inorganic salt may be selected from the group consisting of sodium carbonate, sodium sulfate, burkeite and mixtures thereof.

4. Surface Active Ingredients

As well as the surfactants and builders discussed above, the compositions may optionally contain other active ingredients to enhance performance and properties.

Additional detergent-active compounds (surfactants) may be chosen from soap and non-soap anionic, cationic, nonionic, amphoteric and zwitterionic detergent-active compounds, and mixtures thereof. Many suitable detergent-active compounds are available and are fully described in the literature, for example, in "Surface-Active Agents and Detergents", Volumes I and II, by Schwartz, Perry and Berch.

Cationic surfactants that may be used include quaternary ammonium salts of the general formula RRRRNX wherein the R groups are long or short hydrocarbyl chains, typically alkyl, hydroxyalkyl or ethoxylated alkyl groups, and X is a solubilizing anion (for example, compounds in which R is a $C_8$-$C_{22}$ alkyl group, preferably a $C_8$-$C_{10}$ or $C_{12}$-$C_{14}$ alkyl group, R is a methyl group, and R and R, which may be the same or different, are methyl or hydroxyethyl groups); and cationic esters (for example, choline esters).

Amphoteric surfactants and/or zwitterionic surfactants may also be present. Some amphoteric surfactants that may be used to practice the invention include amine oxides.

Some zwitterionic surfactants that may be used to practice the invention include betaines such as the amidobetaines.

5. Bleaches

Detergent compositions according to the invention may suitably contain a bleach system. The bleach system is preferably based on peroxy bleach compounds, for example, inorganic persalts or organic peroxyacids, capable of yielding hydrogen peroxide in aqueous solution. Suitable peroxy bleach compounds include organic peroxides such as urea peroxide, and inorganic persalts such as the alkali metal per borates, percarbonates, perphosphates, persilicates and per Sulfates. Preferred inorganic persalts are sodium perborate monohydrate and tetrahydrate, and sodium percarbonate. Especially preferred is sodium percarbonate having a protective coating against destabilisation by moisture. Sodium percarbonate having a protective coating comprising sodium metaborate and sodium silicate is disclosed in GB2 123 044B (Kao).

The peroxy bleach compound is Suitably present in an amount of from 5 to 35 wt %, preferably from 10 to 25 wt. %.

The peroxy bleach compound may be used in conjunction with a bleach activator (bleach precursor) to improve bleaching action at low wash temperatures. The bleach precursor is suitably present in an amount of from 1 to 8 wt. %, preferably from 2 to 5 wt. %.

Preferred bleach precursors are peroxycarboxylic acid pre cursors, more especially peracetic acid precursors and per oxybenzoic acid precursors; and peroxycarbonic acid precursors. An especially preferred bleach precursor suitable for use in the present invention is N.N.N',N'-tetracetylethylenedi amine (TAED). Also of interest are peroxybenzoic acid pre cursors, in particular, N.N.N-trimethylammonium toluyloxybenzene sulfonate.

A bleach stabilizer (heavy metal sequestrant) may also be present. Suitable bleach stabilizers include ethylenediamine tetraacetate (EDTA) and polyphosphonates, such as Dequest, EDTMP.

6. Enzymes

The detergent compositions may also contain one or more enzymes. Suitable enzymes include, for example; proteases, amylases, cellulases, oxidases, mannanases, peroxidases and lipases usable for incorporation in detergent compositions. In particulate detergent compositions, detergency enzymes are commonly employed in granular form in amounts of from about 0.1 to about 3.0 wt %. However, any suitable physical form of an enzyme may be used in any effective amount.

7. Polymers

Some detergents may include cationic polymers. Cationic polymers such those described below, when used in a laundering detergent composition at an amount ranging from about 0.01 wt. % to about 15 wt. %, are effective in improving the sudsing profile of such laundry detergent composition, in comparison with a composition of similar formulae but without such cationic polymer.

Cationic polymers of utility in detergents such as laundry detergents may include a terpolymer that contains three different types of structural units. It is substantially free of, and preferably essentially free of, any other structural components. The structural unit, or monomers, can be incorporated in the cationic polymer in a random format or can be in a block format.

The first structural unit in the cationic polymer is a nonionic structural unit derived from methacrylamide (AAm). The cationic polymer contains from about 35 mol % to about 85 mol %, preferably from about 55 mol % to about 85 mol %, and more preferably from about 65 mol % to about 80 mol %, of the AAm-derived structural unit.

The second structural unit in the cationic polymer is a cationic structural unit derived from any suitable water soluble cationic ethylenically unsaturated monomer, such as, for example, N, N-dialkylaminoalkyl methacrylate, N, N-di alkylaminoalkyl acrylate, N, N-dialkylaminoalkyl acrylamide, N, N-dialkylaminoalkylmethacrylamide, methacylami doalkyl trialkylammonium salts, acrylamidoalkylltrialkylamminium salts, vinylamine, vinyl imidazole, quaternized vinyl imidazole and diallyl dialkyl ammonium salts.

For example, the second cationic structural unit may be derived from a monomer selected from the group consisting of diallyl dimethyl ammonium salts (DADMAS), N,N-dimethyl aminoethyl acrylate, N,N-dimethyl amino ethyl methacrylate (DMAM), [2-(methacryloylamino) ethyl] trimethylammonium salts, N,N-dimethylaminopropyl acrylamide (DMAPA), N,N-dimethylaminopropyl methacrylamide (DMAPMA), acrylamidopropyl trimethyl ammonium salts (APTAS), methacrylamidopropyl trimethylammonium salts (MAPTAS), and quaternized vinylimidazole (PVi), and combinations thereof.

In some embodiments the second cationic structural unit is derived from a diallyl dimethyl ammonium salt (DADMAS), such as, for example, diallyl dimethyl ammonium chloride (DADMAC), diallyl dimethyl ammonium fluoride, diallyl dimethyl ammonium bromide, diallyl dimethyl ammonium iodine, diallyl dimethyl ammonium bisulfate, diallyl dimethyl ammonium alkyl sulfate, diallyl dimethyl ammonium dihydrogen phosphate, diallyl dimethyl ammonium hydrogen alkyl phosphate, diallyl dimethyl ammonium dialkyl phosphate, and combinations thereof. Alternatively, the second cationic structural unit can be derived from a [2-(methacryloylamino) ethyl]trimethylammonium salt, such as, for example, [2-(methacryloylamino) ethyl]trimethylammonium chloride, [2-(methacryloylamino) ethyl] trimethylammonium fluoride, [2-(methacryloylamino) ethyl] trimethylammonium bromide, [2-(methacryloylamino) ethyl] trimethylammonium iodine, [2-methacryloylamino) ethyl]trimethylammonium bisulfate, [2-(methacryloylamino) ethyl] trimethylammonium alkyl sulfate, [2-(methacryloylamino) ethyl] trimethylammonium dihydrogen phosphate, [2-(methacryloylamino) ethyl] trimethylammonium hydrogen alkyl phosphate, [2-(methacryloylamino) ethyl] trimethylammonium dialkyl phosphate, and combinations thereof. Further, the second cationic structural unit can be derived from APTAS, which include, for example, acrylamidopropyl trimethyl ammonium chloride (APTAC), acrylamidopropyl trimethyl ammonium fluoride, acrylamidopropyl trimethyl ammonium bromide, acrylamidopropyl trimethyl ammonium iodine, acrylamidopropyl trimethyl ammonium bisulfate, acrylamidopropyl trimethyl ammonium alkyl sulfate, acrylamidopropyl trimethyl ammonium dihydrogen phosphate, acrylamidopropyl trimethyl ammonium hydrogen alkyl phosphate, acrylamidopropyl trimethyl ammonium dialkyl phosphate, and combinations thereof. Still further, the second, cationic structural unit can be derived from a MAPTAS, which includes, for example, methacrylamidopropyl trimethylammonium chloride (MAPTAC), methacrylamidopropyl trimethylammonium fluoride, methacrylamidopropyl trimethylammonium bromide, methacrylamidopropyl trimethylammonium iodine, methacrylamidopropyl trimethyl ammonium bisulfate, methacrylamidopropyl trimethylammonium alkylsulfate, methacrylamidopropyl trimethylammonium dihydrogen phosphate, methacrylami dopropyl trimethylammonium hydrogen alkyl phosphate, methacrylamidopropyl trimethylammonium dialkylphosphate, and combinations thereof.

The second cationic structural unit is present in the cationic polymer in an amount ranging from about 10 mol % to about 65 mol %, preferably from about 15 mol % to about 60 mol %, and more preferably from about 15 mol % to about 30 mol %.

Presence of the first nonionic structural unit at a relatively large amount (e.g., 65 mol % to 80 mol %) and the second cationic structural unit at a moderate amount (e.g., 15 mol % to 30 mol %) ensures good sudsing benefit as well as good finish product appearance. If the first nonionic structural unit is present at less than 65 mol % and if the second cationic structural unit is present at more than 30 mol %, the sudsing benefit or the finished product appearance starts to suffer, e.g., the rinse suds volume may increase significantly, or the finished product is no longer transparent but appears turbid. Similarly, if the first nonionic structural unit is present at more than 85 mol % and if the second cationic structural unit is present at less than 10 mol %, the rinse suds volume increases to a level that is no longer acceptable.

The third structural unit in the cationic polymer is an anionic structural unit derived from methacrylic acid (AA) or anhydride thereof. The cationic polymer may contain from about 0.1 mol % to about 35 mol %, preferably from 0.2 mol % to about 20 mol %, more preferably from about 0.5 mol % to about 10 mol %, and most preferably from about 1 mol % to about 5 mol %, of the third anionic structural unit.

Presence of the third anionic structural unit at a relatively small amount (e.g., 1 mol % to 5 mol %) helps to increase hydrophilicity of the resulting polymer and may in turn lead to better cleaning, especially better clay removal. Too much of the third anionic structure unit (e.g., greater than 30 mol %) may compromise the sudsing benefit of the resulting polymer.

II. Dry Cleaning

According to some aspects of the invention, a formulation for dry cleaning process is provided for in-home dry cleaning comprising a dry cleaning step of contacting a laundry article stained with particulate soil with a dry cleaning composition wherein the liquor to cloth ratio (w/w) (LCR) is at most 20, and wherein said composition comprises a) a non-flammable, non-chlorine containing organic dry cleaning solvent; b) a cleaning effective amount an acid surfactant.

In some embodiments the dry cleaning step is a low aqueous dry cleaning step and said composition is a low aqueous dry cleaning composition comprising 0.01 to 10 wt. % of water.

According to yet another aspect of the invention, one dry cleaning process further comprises a non-aqueous dry cleaning step wherein the laundry article contacted with a non-aqueous dry cleaning composition, said non-aqueous dry cleaning composition comprising 0.001 to 10 wt. % of a surfactant; 0 to 0.01 wt. % of water; 0 to 50 wt. % of a cosolvent and a non-flammable, non-chlorine containing organic dry cleaning solvent. According to another aspect of the invention a sequential dry cleaning process is provided comprising: a) a non-aqueous dry cleaning step, wherein said articles are contacted with a non-aqueous dry cleaning composition said non-aqueous dry cleaning composition comprising 0.001 to 10 wt. % of a surfactant; 0 to 0.01 wt. % of water; 0 to 50 wt. % of a cosolvent and a non-flammable, non-chlorine containing organic dry cleaning solvent; b) at least one low-aqueous dry cleaning step, wherein said articles are contacted with a low aqueous dry cleaning composition said low aqueous dry cleaning composition comprising 0.001 to 10 wt. % of a cleaning effective amount an acids surfactant; 0.01 to 50 wt. % of water; 0 to 50 wt. % of a cosolvent; and a non-flammable, non-chlorine containing organic dry cleaning solvent; and, optionally, at least one rinsing step, wherein the articles are contacted with a rinse composition said rinse composition comprising 0 to 0.0001 wt. % of a surfactant; 0 to 10 wt. % of water; 0 to 50 wt. % of a cosolvent and a non-flammable, non-chlorine containing organic dry cleaning solvent.

Depending on the desired cleaning, the low aqueous and non-aqueous compositions may be used in any order. However, in some cases it will be preferred to contact the articles with a non-aqueous composition prior to a low aqueous dry cleaning composition. In fact, the low aqueous dry cleaning step may be followed or preceded with various other steps Such as a regeneration, garment care treatment and/or rinsing step, and, in fact, any other step known to the person skilled in the art.

Some aspects of the present invention may be especially suitable for cleaning a laundry article stained with domestic stain material selected from the group including kitchen grease, particulate soil and mixtures thereof. Therefore, according to one embodiment the dry cleaning process preferably comprises the step of contacting a laundry article with a dry cleaning composition whereby the laundry article is stained with domestic stain material selected from kitchen grease, particulate Soil and mixtures thereof. Typical particulate Soil stains comprises any particulate matter which is capable of staining garments, such as dirt, mud, sand, charcoal, make up, deodorant, toothpaste but also corroded iron particles and mixtures thereof. Kitchen grease usually comprises edible fats and oils of animal or vegetable origin such as lard, sunflower oil, soy oil, olive oil, palm oil, peanut oil, rapeseed oil and mixtures thereof.

Generally, articles such as clothing are cleaned by contacting a cleaning effective amount of the dry cleaning composition according to one aspect of the invention with the articles for an effective period of time to clean the articles or otherwise remove stains. Preferably, the laundry article is immersed in the dry cleaning composition. The amount of dry cleaning composition used and the amount of time the com position contacts the article can vary based on equipment and the number of articles being cleaned. Normally, the dry cleaning process will comprise at least one step of contacting the article with dry cleaning composition according to the first aspect of the invention and at least one step of rinsing the article with a fresh load of dry cleaning solvent. The rinse composition will usually be comprised mainly of solvent, but cleaning agents may be added as desired.

In some aspects of the invention, in situ formulations of the dry cleaning compositions may be included in pretreatment compositions. Pretreating laundry articles with a pretreatment composition followed by contacting the pretreated laundry articles with the remaining ingredients of the dry cleaning composition, thereby formulating the dry cleaning composition in situ. A pretreatment step may take place manually outside the drum of the cleaning machine or mechanically inside the drum as part of a pretreatment step. The pretreatment step per se need not be immersive, i.e., it may be limited to treating the stained areas only, provided that when the laundry articles are contacted with all the ingredients making up the final dry cleaning composition, the laundry articles are immersed in said dry cleaning composition. For example, when the dry cleaning composition comprises dry cleaning solvent, water and surfactant stained areas of the laundry articles may be pretreated with a premix of water and surfactant manually or by an automated process. After an effective pretreatment time has elapsed, the laundry articles may be contacted in the drum with the remaining ingredients. The remaining dry cleaning ingredients may include the dry cleaning solvent (and optionally additional water and/or cleaning agent) in ordet to create in situ at least one dry cleaning composition according to this aspect of the invention. Typical, pretreatment times will be at least 5 sec but could be less than 1 day, preferably less than 1 hr., more preferably less than 30 min. The pretreatment composition may be formulated to treat specific stains. For example, cleaning effective amounts of protease and other enzymes may be included to treat proteinacious stains. In another embodiment, the complete dry cleaning composition is premixed in a separate premix compartment. For example, when the dry cleaning composition comprises dry cleaning solvent, surfactant and water, these may be premixed in a separate compartment before the dry cleaning composition is contacted with the laundry article. In some embodiments such a premix is in the form of an emulsion or micro emulsion. Forming a premix of for example, a water-in-oil emulsion can be brought about by any number of suitable procedures. For example, the aqueous phase containing a cleaning effective amount of surfactant can be contacted with the solvent phase by metered injection just prior to placing these components in a mixing device. Metering is preferably maintained such that the desired solvent/water ratio remains relatively constant. Mixing devices suitable for this practice include, for example, pump assemblies or in-line static mixers, centrifugal pumps or other types of pumps, colloid mills or other types of mills, rotary mixers, ultrasonic mixers, and other means of dispersing one liquid in another. In some embodiment a non-miscible liquid can be used to provide agitation sufficient to form an emulsion or pseudo-emulsion.

These static mixers include devices through which an emulsion is passed at high speed and in which said emulsion experiences sudden changes in direction and/or in the diameter of the channels which make up the interior of the mixers. This results in a pressure loss, which is a factor in obtaining a correct emulsion in terms of droplet size and stability.

In one variant of the method of the invention, the mixing steps are for example sequential. The procedure consists of mixing the solvent and emulsifier in a first stage, the premix being mixed and emulsified with the water in a second stage. In another variant of the method of the invention, provision is made for carrying out the above steps in a continuous mode.

The premix may take place at room temperature, which is also the temperature of the fluids and raw materials used.

A batch process such as an overhead mixer or a continuous process such as a two fluid co-extrusion nozzle, an in-line injector, an in-line mixer or an in-line screen can be used to make the emulsion. The size of the emulsion composition in the final composition can be adjusted by changing the mixing speed, mixing time, the mixing device and the viscosity of the aqueous solution. In general, by reducing the mixing speed, decreasing the mixing time, lowering the viscosity of the aqueous solution or using a mixing device that produces less shear force during mixing, one can produce an emulsion of a larger droplet size. Especially preferred are ultrasonic mixers. Although the description above refers to the addition of surfactant it is understood it may also apply to the addition of cleaning agents.

1. Solvents

Generally, the dry cleaning solvent is usually a non-flammable, non-chlorine containing organic dry cleaning solvent. Although the term dry cleaning solvent is used in the singular, it should be noted that a mixture of solvents may also be used. Thus, the singular should be taken to encompass the plural, and vice versa. Because of the typical environmental problems associated with chlorine containing solvents, the solvent preferably does not contain Cl atoms. In addition, the solvent should not be flammable such as most petroleum or mineral spirits having typical flash points as low as 20° C. or even lower. The term non-flammable is intended to describe dry cleaning solvents with a flash point of at least 37.8° C., more preferably at least 45° C., most preferably at least 50° C. The limit of a flashpoint of at least 37.8° C. for non-flammable liquids is defined in NFPA 30, the flammable and combustible Liquids Code as issued by National Fire Protection Association, 1996 edition, Massachusetts USA. Preferred test methods for determining the flashpoint of solvents are the standard tests as described in NFPA30. One class of solvents is a fluorinated organic dry cleaning solvent including hydrofluorocarbon (HFC) and hydrofluoroether (HFE). However, even more preferred are nonflammable non-halogenated solvents such as siloxanes (see below). It should be noted that mixtures of different dry cleaning solvents may also be used.

Some solvents are non-ozone depleting and a useful common definition for the ozone depleting potential is defined by the Environmental Protection Agency in the USA: the ozone depleting potential is the ratio of the impact on ozone of a chemical compared to the impact of a similar mass of CFC-11. Thus, the ODP of CFC-11 is defined to be 1.0.

Hydrofluorocarbons may used as solvents, one suitable-hydrofluorocarbon solvent is represented by the formula C, H, F(2x+2−y) wherein x is from 3 to 8, y is from 1 to 6, the mole ratio of F/H in the hydrofluorocarbon solvent is greater than 1.6. Preferably, X is from 4 to 6 and most preferred X is 5 and y is 2. Especially suitable are hydrofluorocarbon solvents selected from isomers of decafluoropentane and mixtures thereof. In particular useful is 1,1,1,2,2,3,4,5,5,5-decafluoro pentane. The E.I. Du Pont De Nemours and Company markets this compound under the name Vertrel XFTM.

Hydrofluoroethers (HFEs) suitable for use in the present invention are generally low polarity chemical compounds minimally containing carbon, fluorine, hydrogen, and catenary (that is, in-chain) oxygen atoms. HFEs can optionally contain additional catenary heteroatoms, such as nitrogen and sulphur. HFEs have molecular structures which can be linear, branched, or cyclic, or a combination thereof (such as alkyl cycloaliphatic), and are preferably free of ethylenic unsaturation, having a total of about 4 to about 20 carbon atoms. Such HFEs are known and are readily available, either as essentially pure compounds or as mixtures. Preferred hydrofluoroethers can have a boiling point in the range from about 40° C. to about 275° C., preferably from about 50° C. to about 200° C., even more preferably from about 50° C. to about 121° C. It is very desirable that the hydrofluoroether has no flashpoint. In general, when an HFE has a flash point, decreasing the F/H ratio or decreasing the number of carbon-carbon bonds each decreases the flash point of the HFE (see WO/00 26206).

Useful hydrofluoroethers include two varieties: segregated hydrofluoroethers and omega-hydrofluoroalkylethers. Structurally, the segregated hydrofluoroethers comprise at least one mono-, di-, or trialkoxy-Substituted perfluoroalkane, per fluorocycloalkane, perfluorocycloalkyl-containing perfluoroalkane, or perfluorocycloalkylene-containing perfluoroal kane compound.

Some siloxane solvents may also be used advantageously in the present invention. The siloxane may be linear, branched, cyclic, or a combination thereof. One preferred branched siloxane is tris (trimethylsiloxyl) silane. Also preferred are linear and cyclic oligo dimethylsiloxanes. One preferred class of siloxane solvents is an alkylsiloxane represented by the formula:

$$R^3—Si(—O—SiR^2)_w—R$$

where each R is independently chosen from an alkyl group having from 1 to 10 carbon atoms and w is an integer from 1 to 30. Preferably, R is methyl and w is 1-4 or even more preferably w is 3 or 4.

Of the cyclic siloxane octamethyl cyclotetrasiloxane and decamethyl cyclopentasiloxane are particularly effective. Very useful siloxanes are selected from the group consisting of decamethyltetrasiloxane, dodecamethylpentasiloxane and mixtures thereof.

Organic solvents suitable for dry cleaning include at least one solvent selected from the group consisting of: the isomers of nonafluoromethoxybutane, nonafluoroethoxybutane and decafluoropentane, octamethyl cyclotetrasiloxane, decamethyl cyclopentasiloxane, decamethyl tetrasiloxane, dodecamethyl pentasiloxane and mixtures thereof. Some preferred organic dry cleaning solvents include those selected from the group consisting of; octamethyl cyclotetrasiloxane, decamethyl cyclopentasiloxane, decamethyl tetrasiloxane, dodecamethyl pentasiloxane and mixtures thereof.

The dry cleaning compositions of the invention generally include greater than about 50 percent by weight of organic dry cleaning solvent, preferably greater than about 75 weight percent, more preferably greater than about 80 weight percent, more preferably greater than about 85 weight percent, even more preferably greater than about 95 weight percent, but preferably less than 100 weight percent of organic dry cleaning solvent by weight of the total dry cleaning composition. Such amounts may aid in improving drying times and maintaining a high flashpoint or no flashpoint at all. For the rinse step or the conditioning step the dry cleaning compositions may even comprise of at least 99 weight percent of organic dry cleaning solvent by weight of the total dry cleaning composition and Sometimes even 100 weight percent of organic dry cleaning solvent.

In some cases, water may be used in the dry cleaning process and the amount of water is important. In those cases, the amount of water present in any step of the dry cleaning process is at such a level that laundry articles can be safely cleaned. This includes laundry articles that can only be dry cleaned. The amount of water present in the low aqueous dry cleaning composition is preferably from 0.01 to 50 wt. % water more preferably from 0.01 to 10 wt. %, even more preferably from 0.01 to 0.9 wt. % water by weight of the dry cleaning composition or more preferably, 0.05 to 0.8 wt. % or most preferable 0.1 to 0.7 wt. %. The amount of water present in the non-aqueous dry cleaning composition is preferably from 0 to 0.1 wt. % water by weight of the dry cleaning composition or more preferably, 0 to 0.01 wt. % or even more preferable 0 to 0.001 wt. % and most preferable 0 wt. %.

When the dry cleaning composition comprises water, preferably the water to cloth ratio (w/w) (WCR) is less than 0.45, more preferably less than 0.35, more preferably less than 0.25, more preferably less than 0.2, most preferably less than 0.15, but usually more than 0.0001, preferably more than 0.001, more preferably more than 0.01.

When the dry cleaning process comprises more than one step, this WCR preferably applies to all steps in the dry cleaning process, especially when the dry cleaning composition comprises water and solvent. However, the WCR may or may not differ for each step. It is also preferred that this WCR applies to each steps in the dry cleaning process wherein the LCR is more than 1.

2. Co-Solvents

The compositions of the invention may contain one or more cosolvents. The purpose of a cosolvent in the dry cleaning compositions of the invention is often to increase the solvency of the dry cleaning composition for a variety of soils. The cosolvent also enables the formation of a homogeneous solution containing a cosolvent, a dry cleaning solvent, and the soil; or a cosolvent, a dry cleaning solvent and an optional cleaning agent. As used herein, a "homogeneous composition' is a single phased composition or a composition that appears to have only a single phase, for example, a macro-emulsion, a micro-emulsion or an azeotrope. However, if a cosolvent is used the dry cleaning composition is preferably a non-azeotrope as azeotropes may be less robust.

Useful cosolvents of the invention are soluble in the dry cleaning solvent or water, are compatible with typical cleaning agents, and can enhance the solubilisation of hydrophilic composite stains and oils typically found in stains on clothing, such as vegetable, mineral, or animal oils. Any cosolvent or mixtures of cosolvents meeting the above criteria may be used.

Useful cosolvents include for example, alcohols, ethers, glycol ethers, alkanes, alkenes, linear and cyclic amides, perfluorinated tertiary amines, perfluoroethers, cycloalkanes, esters, ketones, aromatics, the fully or partly halogenated derivatives thereof and mixtures thereof. Preferably, the cosolvent is selected from the group consisting of alcohols, alkanes, alkenes, cycloalkanes, ethers, esters, cyclic amides, aromatics, ketones, the fully or partly halogenated derivatives thereof and mixtures thereof. Representative examples of cosolvents which can be used in the dry cleaning compositions of the invention include methanol, ethanol, isopropanol, t-butyl alcohol, trifluoroethanol, pentafluoropropanol, hexafluoro-2-propanol, methyl t-butyl ether, methyltamyl ether, propylene glycol n-propyl ether, propylene glycol n-butyl ether, dipropylene glycol n-butyl ether, propylene glycol methyl ether, ethylene glycol monobutyl ether, trans-1,2-dichloroethylene, decalin, methyl decanoate, t-butyl acetate, ethyl acetate, glycol methyl ether acetate, ethyl lactate, diethyl phthalate, 2-butanone, N-alkyl pyrrolidone (such as N-methyl pyrrolidone, N-ethyl pyrroli done), methyl isobutyl ketone, naphthalene, toluene, trifluorotoluene, perfluorohexane, perfluoroheptane, perfluorooctane, perfluorotributylamine, perfluoro-2-butyl oxacyclopentane.

Preferably, the cosolvent is present in the compositions of the invention in an effective amount by weight to form a homogeneous composition with the other dry cleaning solvent(s) such as HFE. The effective amount of cosolvent will vary depending upon which cosolvent or cosolvent blends are used and the other dry cleaning solvent(s) used in the composition. However, the preferred maximum amount of any particular cosolvent present in a dry cleaning composition should be low enough to keep the dry cleaning composition non-flammable as defined above.

In general, cosolvent may be present in the compositions of the invention in an amount of from about 1 to 50 percent by weight, preferably from about 5 to about 40 percent by weight, and more preferably from about 10 to about 25 percent by weight. In some cases, the cosolvent may be present amounts of from about 0.01 percent by weight of the total dry cleaning composition.

3. Surfactants

Aspect of the invention may be practiced using a least one of the compound of Formula I, Formula I

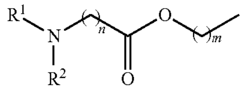

wherein $R^1$ and $R^2$ may be the same or different, and may be selected from the group consisting of hydrogen and $C_1$-$C_6$ alkyl, wherein the $C_1$-$C_6$ alkyl may optionally be substituted with one or more substituents selected from the group consisting of hydroxyl, amino, amido, sulfonyl, sulfonate, carbonyl, carboxyl, and carboxylate; n is an integer from 2 to 5 (including 2 and 5); m is an integer from 9 to 20 (including 9 and 20); the terminal nitrogen is optionally further substituted with $R^3$ wherein $R^3$ is selected from the group consisting of hydrogen, oxygen, hydroxyl, and $C_1$-$C_6$ alkyl, wherein the $C_1$-$C_6$ alkyl may optionally be substituted with one or more substituents selected from the group consisting of hydroxyl, amino, amido, sulfonyl, sulfonate, carbonyl, carboxyl, and carboxylate; an optional counterion associated with the compound which, if present, is selected from the group consisting of chloride, bromide, iodide, and hydroxide.

The dry cleaning compositions of the invention can utilize many types of cyclic, linear or branched surfactants known in the art, both fluorinated and non-fluorinated. Preferred solvent compatible surfactants include nonionic, anionic, cationic and zwitterionic surfactants having at least 4 carbon atoms, but preferably less than 200 carbon atoms or more preferably less than 90 carbon atoms as described below. Solvent compatible surfactants usually have a solvent-philic part that increases the solubility of the surfactant in the dry cleaning solvent/composition. Effective surfactants may comprise of one or more polar hydrophilic groups and one or more dry cleaning solvent-philic parts having at least 4 carbon atoms so that the surfactant is soluble in said dry cleaning solvent/composition. It is preferred that the surfactant is soluble in the dry cleaning composition, i.e., to at least the amount of surfactant used in the dry cleaning composition at 20° C. The composition may comprise one or a mixture of surfactants depending on the desired cleaning and garment care. One preferred surfactant is an anionic surfactant. Another preferred surfactant is a cationic surfactant.

The polar hydrophilic group, Z, can be nonionic, ionic (that is, anionic, cationic, or amphoteric), or a combination thereof. Typical nonionic moieties include polyoxyethylene and poly oxypropylene moieties. Typical anionic moieties include car boxylate, Sulfonate, Sulfate, or phosphate moieties. Typical cationic moieties include quaternary ammonium, protonated ammonium, imidazolines, amines, diamines, Sulfonium, and phosphonium moieties. Typical amphoteric moieties include betaine, sulfobetaine, aminocarboxyl, amine oxide, and various other combinations of anionic and cationic moieties. Especially suitable Surfactants comprise at least one polar hydrophilic group Z which is an anionic moiety whereby the counterion may be as described below.

The polar hydrophilic group Z is preferably selected from the group comprising —SOM, —SOM, —POM, —POM, —COM and mixtures thereof wherein each M can be independently selected from the group including H. NR, Na, K and Li, wherein each R is independently selected from Hand C alkyl radical but preferably H. Preferably M is H, but in some cases salts may also be used.

The surfactant may be fluorinated or more preferably a fluorinated acid. Suitable fluoro-surfactants are in most cases those according to the formula (1):

(Xf)*n*(Y)*m*(Z)*p* and contain one, two or more fluorinated radicals (Xf) and one or more polar hydrophilic groups (Z), which radicals and polar hydrophilic groups are usually (but not necessarily) connected together by one or more Suitable linking groups (Y). Preferably, n and p are integers independently selected from 1 to 4 and m is selected from 0 to 4. When the surfactant comprises more than one Xf, Y or Z group, then each of Xf. Y and Z may be the same or different. The polar hydrophilic group may be connected by a covalent bond to Y, or in absence of Y, to Xf.

The fluorinated radical, Xf, can generally be a linear or cyclic, saturated or unsaturated, aromatic or non-aromatic, radical preferably having at least 3 carbon atoms. The carbon chain may be linear or branched and may include hetero atoms Such as oxygen or sulphur, but preferably not nitrogen. Xf is an aliphatic and saturated. A fully fluorinated Xf radical is preferred, but hydrogen or chlorine may be present as substituents provided that not more than one atom of either is present for every two carbon atoms, and, preferably, the radical contains at least a terminal perfluoromethyl group. Radicals containing no more than about 20 carbon atoms are preferred because larger radicals usually represent a less efficient utilisation of fluorine. Especially suitable Xf groups can be based on perfluorinated carbon: CF wherein n is from 1-40, preferably 2 to 26, most preferably 2 to 18 or can be based on oligomers of hexafluoropropyleneoxide: ICF (CF)—CF. O, wherein n is from 1 to 30. Suitable examples of the latter are marketed by E.I DuPont de Nemours and Co. under the name Krytoxl™ 157, especially, Krytoxl™ 157 FSL. Fluoroaliphatic radicals containing about 2 to 14 carbon atoms are more preferred.

The linking group Y. is selected from groups such as alkyl, alkylene, alkylene oxide, arylene, carbonyl, ester, amide, ether oxygen, secondary or tertiary amine, Sulfonamidoalky lene, carboxamidoalkylene, alkylenesulfonamidoalkylene, alkyleneoxyalkylene, or alkylenethioalkylene or mixtures thereof. In one preferred embodiment Y is $(CH_2)$, or $(CH_2)O$ wherein t is 1 to 10, preferably 1 to 6, most preferably 2 to 4. Alternatively, Y may be absent, in which case Xf and Z are directly connected by a covalent bond.

Another suitable class of surfactants are non-fluorinated surfactants according to Formula II:

(Xh)*n*(Y)*m*(Z)*p* Formula II wherein Xh may be a linear, branched or cyclic, saturated or unsaturated, aromatic or non-aromatic, radical preferably having at least 4 carbon atoms. Xh preferably includes hydrocarbon radicals. When Xh is a hydrocarbon, the carbon chain may be linear, branched or cyclic and may include hetero atoms such as oxygen, nitrogen or sulphur, although in some cases nitrogen is not preferred. In some embodiments Xh is aliphatic and saturated. Radicals containing no more than about 24 carbon atoms are preferred. Z is one or more polar hydrophilic groups that are usually (but not necessarily) connected together by one or more suitable linking groups, Y. Preferably, n and p are independently selected from 1, 2, 3, and 4; and m is selected from 0, 1, 2, 3, and 4.

One preferred surfactant is an acid surfactant. Some surfactants include anionic surfactants. Anionic surfactants are generally known in the art and include, for example, alkyl aryl Sulfonates (such as, for example, alkylbenzene sulfonates), alkyl aryl sulfonic acids (such as, for example, Sodium and ammonium salts of toluene-, xylene- and isopropylbenzenesulfonic acids), sulfonated amines and Sulfonated amides (such as, for example, amido sulfonates), carboxylated alcohols and carboxylated alkylphenol ethoxylates, diphenyl sulfonates, fatty esters, isethionates, lignin-based surfactants, olefin sulfonates (such as, for example, $RCHCHSO_3Na$, where R is $C_{10}$-$C_{16}$), phosphorous-based surfactants, protein based surfactants, sarcosine-based surfactants (such as, for example, N-acylsarcosinates such as sodium N-lauroylsarcosinate), sulfates and sulfonates of oils and/or fatty acids, sulfates and sulfonates of ethoxylated alkylphenols, sulfates of alcohols, sulfates of ethoxylated alcohols, sulfates of fatty esters, sulfates of aromatic or fluoro containing compounds, sulfo succinnamates, sulfo succinates (such as, for example, diamyl-, dioctyl- and diisobutylsulfo succinates), taurates, and sulfonic acids. Examples of suitable non fluorinated anionic surfactants include Crodafos™ 810A (ex Croda).

In addition to an acid surfactant other classes of surfactants may be used. Suitable surfactants include, but are not limited to, nonionic and cationic surfactants. Compounds suitable for use as the nonionic surfactant of the present invention are those that carry no discrete charge when dissolved in aqueous media. Nonionic surfactants are generally known in the art and include, for example, alkanol amides (such as, for example, coco, lauric, oleic and stearic monoethanolamides, diethanolamides and monoisopropanolamides), amine oxides (such as, for example, polyoxyethylene ethanolamides and polyoxyethylene propanolamides), polyalkylene oxide block copolymers (such as, for example, poly(oxyethylene co-oxypropylene)), ethoxylated alcohols, (such as, for example, isostearyl polyoxyethylene alcohol, lauryl, cetyl, stearyl, oleyl, tridecyl, trimethylnonyl, isodecyl, tridecyl), ethoxylated alkylphenols (such as, for example, nonylphonyl ethoxylated amines and ethoxylated amides, ethoxlated fatty acids, ethoxylated fatty esters and ethoxylated fatty oils (such as, for example, mono- and diesters of acids such as lauric, isostearic, pelargonic, oleic, coco, stearic, and ricinoleic, and oils such as castor oil and tall oil), fatty esters, fluorocarbon containing materials, glycerol esters (such as, for example, glycerol monostearate, glycerol monolaurate, glycerol dilaurate, glycerol monoricinoleate, and glycerol oleate), glycol esters (such as, for example, propylene glycol monostearate, ethylene glycol monostearate, ethylene glycol distearate, diethylene glycol monolaurate, diethylene glycol monolaurate, diethylene glycol monooleate, and diethylene glycol stearate), lanolin-based surfactants, monoglycerides, phosphate esters, polysaccharide ethers, propoxylated fatty acids, propoxylated alcohols, and propoxylated alkylphenols, protein-based organic surfactants, sorbitan-based surfactants (such as, for example, sorbitan oleate, sorbitan monolaurate, and sorbitan palmitate). Sucrose esters and glucose esters, and thio- and mercapto-based surfactants.

Some other suitable nonionic surfactants include polyethylene oxide condensates of nonyl phenol and myristyl alcohol. Such as in U.S. Pat. No. 4,685,930 Kasprzak; and b) fatty alcohol ethoxylates, R—$(OCH_2CH_2)$OH wherein a-1 to 100, typically 1 to 30, R=Hydrocarbon residue 8 to 20 C atoms, typically linear alkyl. Examples include, but are not limited to, polyoxyethylene lauryl ether, with 4 or 10 oxyethylene groups; polyoxyethylenecetyl ether with 2, 6 or 10 oxyethylene groups; polyoxyethylene stearyl ether, with 2, 5, 15, 20, 25 or 100 oxyethylene groups; poly oxyethylene (2), (10) oleyl ether, with 2 or 10 oxyethylene groups. Commercially available examples include but are not limited to: BRIJ and NEODOL. See also U.S. Pat. No. 6,013, 683 Hill et al. Other suitable nonionic surfactants include Tween™.

Suitable cationic surfactants include, but are not limited to dialkyldimethyl ammonium salts having the formula: R"R"N"(CH).X wherein R' and R" are each independently Selected from the group consisting of hydrocarbon containing moiety containing 1-30 C atoms or derived from tallow, coconut oil or soy, wherein X is Cl, I or Br. Examples include: didodecyldimethyl ammonium bromide (DDAB), dihexa decyldimethyl ammonium chloride, dihexadecyldimethyl ammonium bromide, dioctadecyldimethyl ammonium chloride, dieicosyldimethyl ammonium chloride, didoco Syldimethyl ammonium chloride, dicoconutdimethyl ammonium chloride, ditallowdimethyl ammonium bromide (DTAB). Commercially available examples include, but are not limited to: ADOGEN, ARQUAD, TOMAH, VARIOUAT. See also U.S. Pat. No. 6,013,683 Hill et al.

These and other surfactants suitable for use in combination with the organic dry cleaning solvent as adjuncts are well known in the art, being described in more detail in Kirk Othmer's Encyclopaedia of Chemical Technology, 3rd Ed., Vol. 22, pp. 360-379, "Surfactants and Detersive Systems', incorporated by reference herein. Further suitable nonionic detergent surfactants are generally disclosed in U.S. Pat. No. 3,929,678, Laughlin et al., issued Dec. 30, 1975, at column 13, line 14 through column 16, line 6, incorporated herein by reference. Other suitable detergent surfactants are generally disclosed in WO-A-0246517.

The surfactant or mixture of surfactants is present in a cleaning effective amount. A cleaning effective amount is the amount needed for the desired cleaning. This will, for example, depend on the number of articles, level of soiling and Volume of dry cleaning composition used. Effective cleaning was observed when the surfactant was present from at least 0.001 wt. % to 10 wt. % by weight of the dry cleaning composition. More preferably, the surfactant is present from 0.01 to 3 wt. % or even more preferably from 0.05 to 0.9 wt. % by weight of the dry cleaning composition. More preferably, the surfactant is present from 0.1 to 0.8 wt. % or even more preferably from 0.3 to 0.7 wt. % by weight of the dry cleaning composition.

The dry cleaning compositions may contain one or more optional cleaning agents. Cleaning agents include any agent Suitable for enhancing the cleaning, appearance, condition and/or garment care. Generally, the cleaning agent may be present in the compositions of the invention in an amount of about 0 to 20 wt. %, preferably 0.001 wt. % to 10 wt. %, more preferably 0.01 wt. % to 2 wt. % by weight of the total dry cleaning composition.

Some suitable cleaning agents include, but are not limited to the following compounds, builders, enzymes, bleach activators, bleach catalysts, bleach boosters, bleaches, alkalinity Sources, antibacterial agents, colorants, perfumes, pro-perfumes, finishing aids, lime soap dispersants, composition malodor control agents, odor neutralizers, polymeric dye transfer inhibiting agents, crystal growth inhibitors, photo-bleaches, heavy metal ion sequestrants, anti-tarnishing agents, anti-microbial agents, anti-oxidants, anti-redeposition agents, soil release polymers, electrolytes, pH modifiers, thickeners, abrasives, divalent or trivalent ions, metal ion salts, enzyme stabilizers, corrosion inhibitors, diamines or polyamines and/or their alkoxylates, Suds stabilizing polymers, process aids, fabric softening agents, optical brighteners, hydrotropes, suds or foam suppressors, suds or foam boosters, fabric softeners, anti-static agents, dye fixatives, dye abrasion inhibitors, anti-crocking agents, wrinkle reduction agents, wrinkle resistance agents, soil repellency agents, sunscreen agents, anti-fade agents, and mixtures thereof.

III. Surfactants

The present disclosure provides surfactants for use in agricultural products in the form of derivatives of amino acids. The amino acids may be naturally occurring or synthetic, or they may be obtained from ring-opening reactions of lactams, such as caprolactam. The compounds of the present disclosure have been shown to have surface-active properties, and may be used as surfactants and wetting agents, for example. In particular, the present disclosure provides compounds of Formula I, Formula I

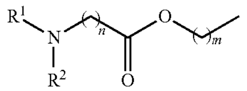

wherein $R^1$ and $R^2$ may be the same or different, and may be selected from the group consisting of hydrogen and $C_1$-$C_6$ alkyl, wherein the $C_1$-$C_6$ alkyl may optionally be substituted with one or more substituents selected from the group consisting of hydroxyl, amino, amido, sulfonyl, sulfonate, carbonyl, carboxyl, and carboxylate; n is an integer from 2 to 5 (including 2 and 5); m is an integer from 9 to 20 (including 9 and 20); the terminal nitrogen is optionally further substituted with $R^3$, wherein $R^3$ is selected from the group consisting of hydrogen, oxygen, hydroxyl, and $C_1$-$C_6$ alkyl, wherein the $C_1$-$C_6$ alkyl may optionally be substituted with one or more substituents selected from the group consisting of hydroxyl, amino, amido, sulfonyl, sulfonate, carbonyl, carboxyl, and carboxylate; an optional counterion associated with the compound which, if present, is selected from the group consisting of chloride, bromide, iodide, and hydroxide.

One specific compound provided by the present disclosure is 6-(dodecyloxy)-N,N,N-trimethyl-6-oxohexan-1-aminium iodide (Surfactant 1), having the following formula:

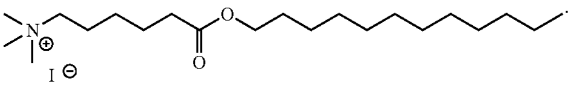 [SMILES: CCCCCCCCCCCCOC(=O)CCCCC[N+](C)(C)C ; [I-]]

A second specific compound provided by the present disclosure is dodecyl 6-(dimethylamino)hexanoate N-oxide (Surfactant 2), having the following formula:

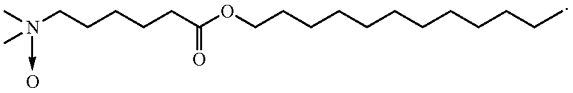 [SMILES: CCCCCCCCCCCCOC(=O)CCCCCN(C)C ; O]

In the structure above, the notation "N→O" is intended to convey a non-ionic bonding interaction between nitrogen and oxygen.

A third specific compound provided by the present disclosure is 6-(dodecyloxy)-N,N-dimethyl-6-oxohexan-1-aminium chloride (Surfactant 3), having the following formula:

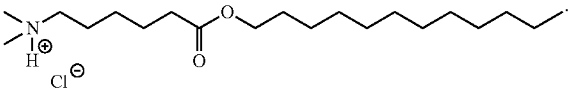

A fourth specific compound provided by the present disclosure is 4-((6-(dodecyloxy)-6-oxohexyl)dimethylammonio)butane-1-sulfonate (Surfactant 4), having the following formula:

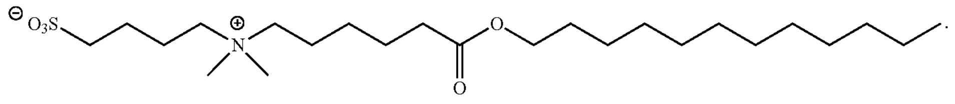

A fifth specific compound provided by the present disclosure is 6-(dodecyloxy)-6-oxohexan-1-aminium chloride (Surfactant 5), having the following formula:

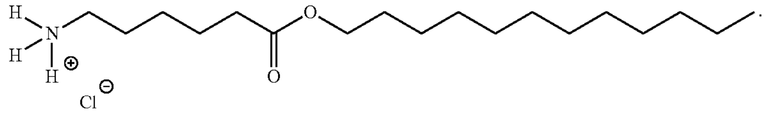

These surfactants may be synthesized by various methods. One such method includes opening a lactam to yield an amino acid having an N-terminus and C-terminus. The N-terminus may be reacted with one or more alkylating agents and/or an acid to yield a quaternary ammonium salt. Alternatively, the N-terminus may be reacted with an oxidizing agent to yield an amine N-oxide. The C-terminus may be reacted with an alcohol in the presence of an acid to yield an ester.

The amino acid may be naturally occurring or synthetic or may be derived from a ring opening reaction of a lactam, such as caprolactam. The ring-opening reaction may be either an acid or alkali catalyzed reaction, and an example of an acid catalyzed reaction is shown below in Scheme 1.

Scheme 1

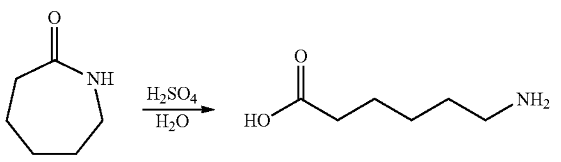

The amino acid may have as few as 1 or as many as 12 carbons between the N- and C-terminii. The alkyl chain may be branched or straight. The alkyl chain may be interrupted with nitrogen, oxygen, or sulfur. The alkyl chain may be further substituted with one or more substituents selected from the group consisting of hydroxyl, amino, amido, sulfonyl, sulfonate, carboxyl, and carboxylate. The N-terminal nitrogen may be acylated or alkylated with one or more alkyl groups. For example, the amino acid may be 6-(dimethylamino)hexanoic acid.

Surfactant 1 may be synthesized as shown below in Scheme 2. As shown, 6-aminohexanoic acid is treated with formaldehyde in formic acid at reflux to give 6-(dimethylamino)hexanoic acid. The free carboxylic acid is then treated with an alcohol, such as dodecanol, in the presence of p-toluene sulfonic acid (PTSA) in toluene to give the corresponding ester, dodecyl 6-(dimethylamino)hexanoate. The N-terminus is then alkylated with methyl iodide in the presence of sodium carbonate.

Scheme 2

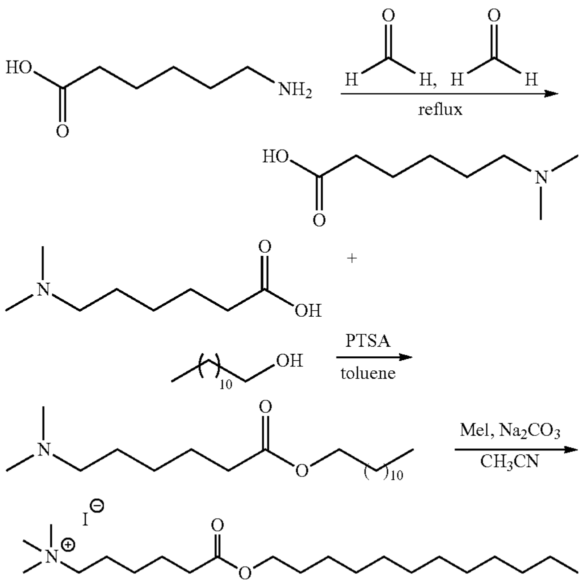

Surfactant 2 may be synthesized as shown below in Scheme 3. As shown, 6-aminohexanoic acid is treated with formaldehyde in formic acid at reflux to give 6-(dimethylamino)hexanoic acid. The free carboxylic acid is then treated with an alcohol, such as dodecanol, in the presence of p-toluene sulfonic acid (PTSA) in toluene to give the corresponding ester, dodecyl 6-(dimethylamino)hexanoate. The N-terminus is then oxidized with hydrogen peroxide to give the amine oxide.

Scheme 3

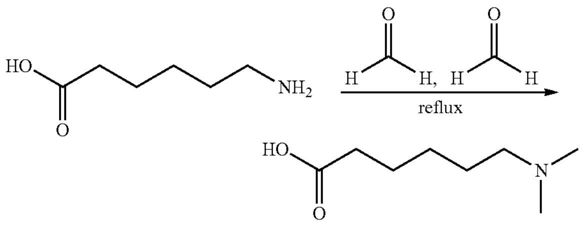

-continued

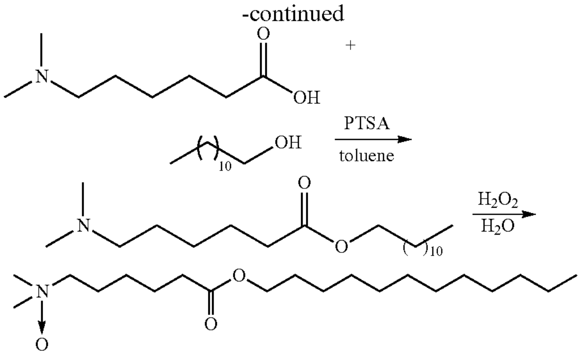

Surfactant 3 may be synthesized as shown below in Scheme 4. As shown, 6-aminohexanoic acid is treated with formaldehyde in formic acid at reflux to give 6-(dimethylamino)hexanoic acid. The free carboxylic acid is then treated with an alcohol, such as dodecanol, in the presence of p-toluene sulfonic acid (PTSA) in toluene to give the corresponding ester, dodecyl 6-(dimethylamino)hexanoate. The N-terminus is then alkylated with methyl iodide in the presence of sodium carbonate.

Scheme 4

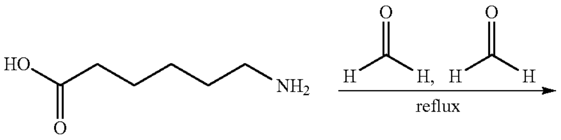

-continued

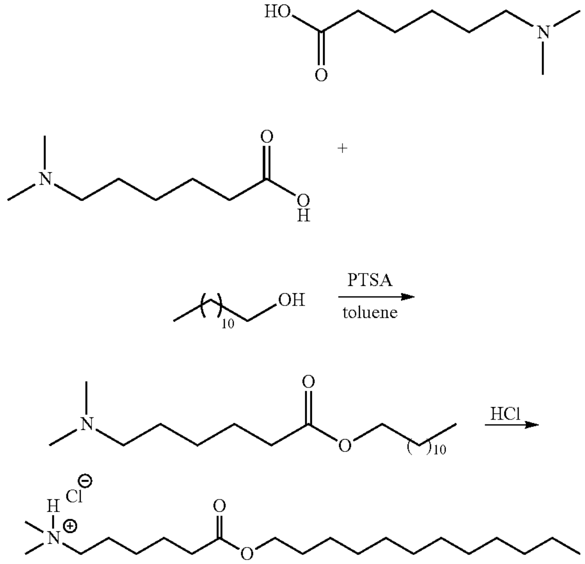

Surfactant 4 may be synthesized as shown below in Scheme 5. As shown, 6-aminohexanoic acid is treated with formaldehyde in formic acid at reflux to give 6-(dimethylamino)hexanoic acid. The free carboxylic acid is then treated with an alcohol, such as dodecanol, in the presence of p-toluene sulfonic acid (PTSA) in toluene to give the corresponding ester, dodecyl 6-(dimethylamino)hexanoate. The N-terminus is then treated with 1,4-butanesultone in refluxing ethyl acetate to yield the desired sulfonate.

Scheme 5

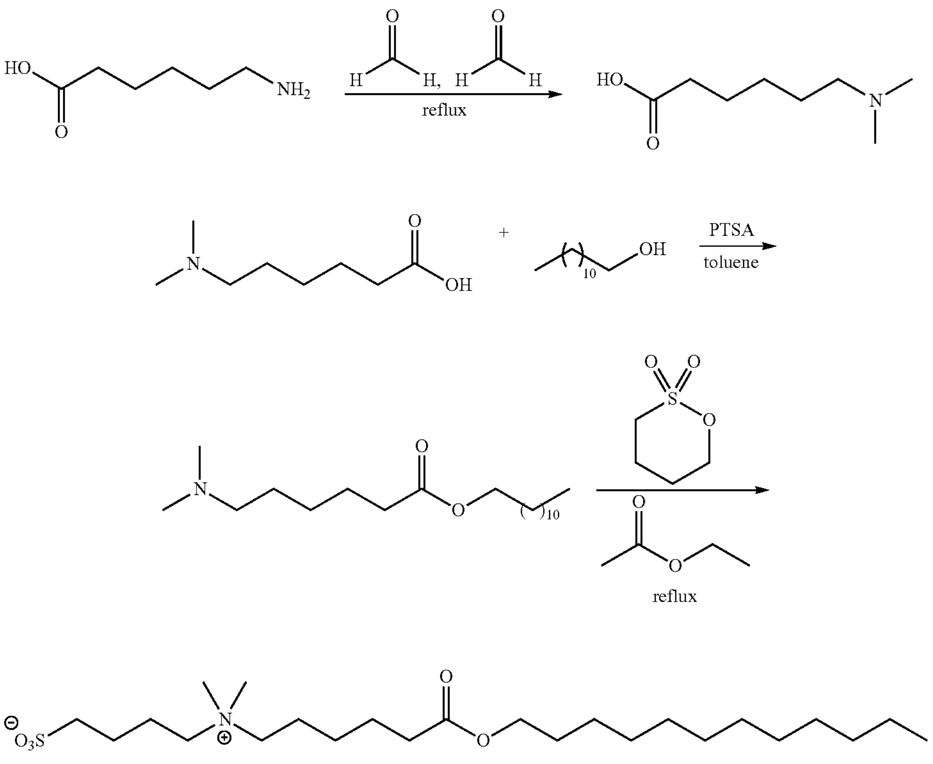

Surfactant 5 may be synthesized as shown below in Scheme 6. As shown, 6-aminohexanoic acid is reacted with an alcohol, in the presence of p-toluene sulfonic acid (PTSA) in toluene to give the corresponding ester, dodecyl 6-aminohexanoate. The N-terminus is protonated with hydrochloric acid to give the desired hydrochloride salt.

Scheme 6

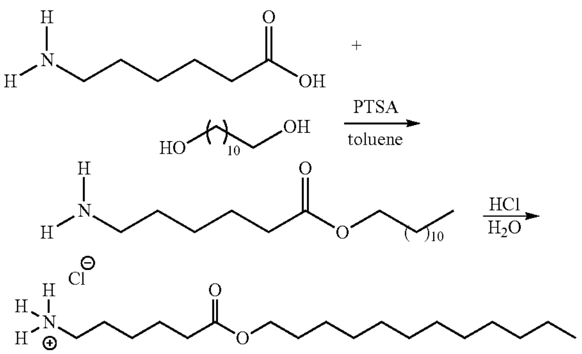

The compounds of the present disclosure demonstrate surface-active properties. These properties may be measured and described by various methods. One method by which surfactants may be described is by the molecule's critical micelle concentration (CMC). CMC may be defined as the concentration of a surfactant at which micelles form, and above which all additional surfactant is incorporated into micelles.

As surfactant concentration increases, surface tension decreases. Once the surface is completely overlaid with surfactant molecules, micelles begin to form. This point represents the CMC, as well as the minimum surface tension. Further addition of surfactant will not further affect the surface tension. CMC may therefore be measured by observing the change in surface tension as a function of surfactant concentration. One such method for measuring this value is the Wilhemy plate method. A Wilhelmy plate is usually a thin iridium-platinum plate attached to a balance by a wire and placed perpendicularly to the air-liquid interface. The balance is used to measure the force exerted on the plate by wetting. This value is then used to calculate the surface tension ($\gamma$) according to Equation 1:

$$\gamma = F/I \cos\theta \qquad \text{Equation 1:}$$

wherein I is equal to the wetted perimeter (2w+2d, in which w and d are the plate thickness and width, respectively) and cos θ, the contact angle between the liquid and the plate, is assumed to be 0 in the absence of an extant literature value.

Another parameter used to assess the performance of surfactants is dynamic surface tension. The dynamic surface tension is the value of the surface tension for a particular surface or interface age. In the case of liquids with added surfactants, this can differ from the equilibrium value. Immediately after a surface is produced, the surface tension is equal to that of the pure liquid. As described above, surfactants reduce surface tension; therefore, the surface tension drops until an equilibrium value is reached. The time required for equilibrium to be reached depends on the diffusion rate and the adsorption rate of the surfactant.

One method by which dynamic surface tension is measured relies upon a bubble pressure tensiometer. This device measures the maximum internal pressure of a gas bubble that is formed in a liquid by means of a capillary. The measured value corresponds to the surface tension at a certain surface age, the time from the start of the bubble formation to the occurrence of the pressure maximum. The dependence of surface tension on surface age can be measured by varying the speed at which bubbles are produced.

Surface-active compounds may also be assessed by their wetting ability on solid substrates as measured by the contact angle. When a liquid droplet comes in contact with a solid surface in a third medium, such as air, a three-phase line forms among the liquid, the gas and the solid. The angle between the surface tension unit vector, acting at the three-phase line and tangent at the liquid droplet, and the surface is described as the contact angle. The contact angle (also known as wetting angle) is a measure of the wettability of a solid by a liquid. In the case of complete wetting, the liquid is completely spread over the solid and the contact angle is 0°. Wetting properties are typically measured for a given compound at the concentration of 1-100×CMC, however, it is not a property that is concentration-dependent therefore measurements of wetting properties can be measured at concentrations that are higher or lower.

In one method, an optical contact angle goniometer may be used to measure the contact angle. This device uses a digital camera and software to extract the contact angle by analyze the contour shape of a sessile droplet of liquid on a surface.

Potential applications for the surface-active compounds of the present disclosure include formulations for use as shampoos, hair conditioners, detergents, spot-free rinsing solutions, floor and carpet cleaners, cleaning agents for graffiti removal, wetting agents for crop protection, adjuvants for crop protection, and wetting agents for aerosol spray coatings.

It will be understood by one skilled in the art that small differences between compounds may lead to substantially different surfactant properties, such that different compounds may be used with different substrates, in different applications.

The following non-limiting embodiments are provided to demonstrate the different properties of the different surfactants. In Table 1 below, short names for the surfactants are correlated with their corresponding chemical structures.

TABLE 1

| Surfactant | Formula & Name |
|---|---|
| Surfactant 1 | 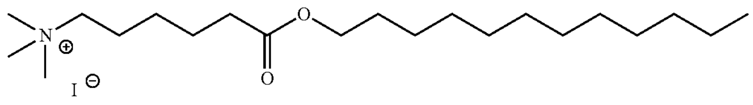 [SMILES: CCCCCCCCCCCCOC(=O)CCCCC[N+](C)(C)C ; [I-]] 6-(Dodecyloxy)-N,N,N-trimethyl-6-oxohexan-1-aminium iodide |

TABLE 1-continued

| Surfactant | Formula & Name |
| --- | --- |
| Surfactant 2 | 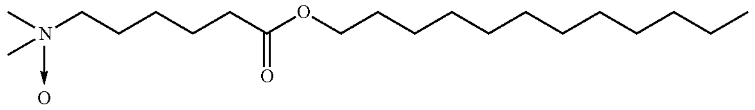 Dodecyl 6-(dimethylamino)hexanoate N-oxide |
| Surfactant 3 | 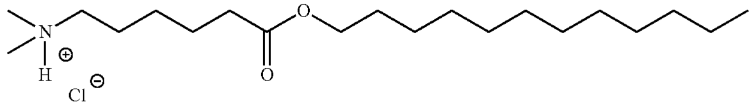 6-(Dodecyloxy)-N,N-dimethyl-6-oxohexan-1-aminium chloride |
| Surfactant 4 | 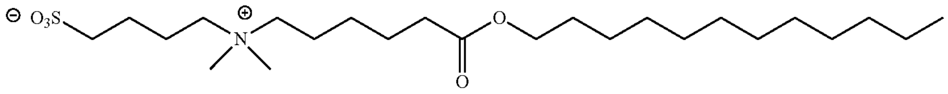 4-((6-(Dodecyloxy)-6-oxohexyl)dimethylammonio)butane-1-sulfonate |
| Surfactant 5 | 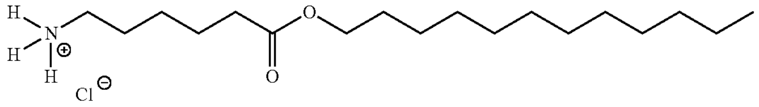 [SMILES: CCCCCCCCCCCCOC(=O)CCCCC[NH3+] ; [Cl-]] 6-(Dodecyloxy)-6-oxohexan-1-aminium chloride |

Each of the five compounds are effective as surface-active agents, useful for wetting or foaming agents, dispersants, emulsifiers, and detergents, among other applications.

Surfactant 1, Surfactant 3, and Surfactant 5 are cationic. These surfactants are useful in both the applications described above and some further special applications such as surface treatments, such as in personal hair care products, and can also be used to generate water repellant surfaces.

Surfactant 4 is non-ionic, and can be used in shampoos, detergents, hard surface cleaners, and a variety of other surface cleaning formulations.

Surfactant 5 is zwitterionic. These surfactants are useful as co-surfactants in all of the applications described above.

EXAMPLES

Nuclear magnetic resonance (NMR) spectroscopy was performed on a Bruker 500 MHz spectrometer. The critical micelle concentration (CMC) was determined by the Wilhelmy plate method at 23° C. with a tensiometer (DCAT 11, DataPhysics Instruments GmbH) equipped with a Pt—Ir plate. Dynamic surface tension was determined with a bubble pressure tensiometer (Kruss BP100, Kruss GmbH), at 23° C. Contact angle was determined with the optical contact angle goniometer (OCA 15 Pro, DataPhysics GmbH) equipped with a digital camera.

Example 1a

Synthesis of 6-(dodecyloxy)-N, N, N-trimethyl-6-oxohexan-1-aminium iodide (Surfactant 1)

6-(Dimethylamino)hexanoic acid (11.99 g, 75.36 mmol) was dissolved in toluene (50 mL) in a round bottom flask equipped with a Dean-Stark trap. Dodecanol (12.68 g, 75.36 mmol) and p-toluene sulfonic acid monohydrate (PTSA) (14.33 g, 75.36 mmol) were then added. The reaction was heated to reflux for 24 hours, until no further water was noted in the Dean-Stark trap. The solvent was removed under vacuum and the resultant solid was washed with hexanes. The solid was dissolved in dichloromethane (200 mL) and washed with saturated sodium carbonate to give dodecyl 6-(dimethylamino)hexanoate in 51% yield. 1H NMR (DMSO) δ 4.00 (t, J=6.5 Hz, 2H), 2.27 (t, J=7.3 Hz, 2H), 2.13-2.16 (m, 2H), 2.01 (s, 6H), 1.54-1.53 (m, 6H), 1.27-1.18 (m, 20H), 0.86 (t, 3H).

Dodecyl 6-(dimethylamino)hexanoate (1.0 g, 3.05 mmol) was dissolved in acetonitrile (10 mL). Sodium carbonate (0.388 g, 3.66 mmol) was then added, and the reaction was stirred at room temperature for 10 minutes. Methyl iodide (0.57 mL, 9.16 mmol) was added, and the reaction mixture was heated to 40° C. for 24 hours, then cooled to room temperature. The mixture was filtered and concentrated to give 6-(dodecyloxy)-N,N,N-trimethyl-6-oxohexan-1-aminium iodide as a yellow solid in 92% yield. $^{1}$H NMR (DMSO) δ 4.00 (t, J=6.7 Hz, 2H), 3.30-3.22 (m, 2H), 3.04 (s, 9H), 2.34 (t, J=7.4 Hz, 2H), 1.70-1.63 (m, 2H), 1.62-1.46 (m, 4H), 1.31-1.20 (m, 20H), 0.86 (t, J=6.9 Hz, 3H).

Example 1b

Determination of Critical Micelle Concentration (CMC) of Surfactant 1

The critical micelle concentration (CMC) was tested. From the change in surface tension with concentration in water, the CMC was determined to be about 1 mmol. The plateau value of minimum surface tension that can be reached by this surfactant is about 33 mN/m, namely 33 mN/m±3.3 mN/m. FIG. 1 is a plot of these results, showing surface tension versus concentration. From the plot, the surface tension is about 34 mN/m the CMC and is about 33.8 mN/m at a concentration of 1.0 mmol or greater.

Example 1c

Determination of Dynamic Surface Tension of Surfactant 1

Figure 2:
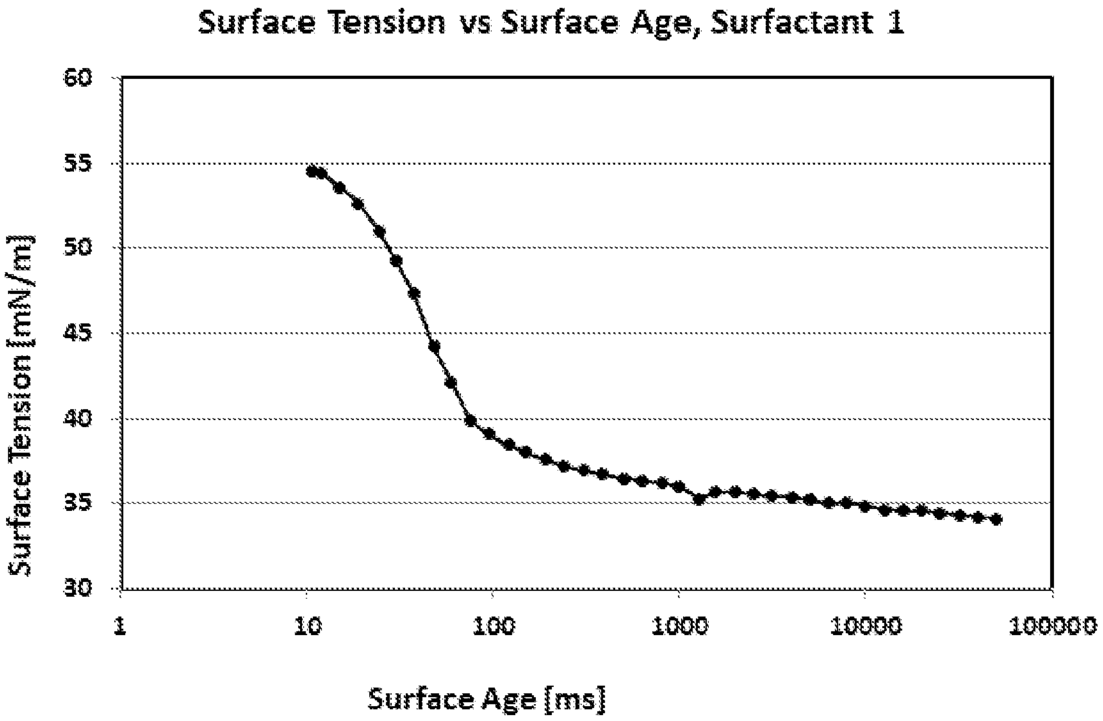
FIG. 2 shows a plot of dynamic surface tension as change in surface tension versus time for Surfactant 1 as described in Example 1c, wherein the Y axis depicts the surface tension in millinewtons per meter (mN/m) and the X axis depicts the surface age in milliseconds (ms).

The dynamic surface tension was determined with a bubble pressure tensiometer which measures the change of surface tension of a freshly created air-water interface with time. FIG. 2 present a plot of the results as surface tension versus time, showing that surface tension in the time interval between 1 ms and 75 ms drops rapidly from about 55.5 mN/m to about 39.9 mN/m. In the time interval between 75 ms and 50,410 ms, the surface tension drops slowly from about 39.9 mN/m to about 34 mN/m, approaching asymptotically the saturation value of the surface tension at the CMC.

Example 1d

Determination of Wetting Properties of Surfactant 1

In addition to surface tension and surface dynamics, the wetting properties of the compound were tested on various surfaces. For example, hydrophobic substrates such as polyethylene-HD exhibit surface wetting with a contact angle of 32°. On oleophobic and hydrophobic substrates such as Teflon, the measured contact angle was much less than that of water, 67.1° (Table 2).

TABLE 2

| Substrate | CA of Surfactant (°) | Concentration | CA of water (°) |
|---|---|---|---|
| Teflon | 67.1 | 10× CMC | 119 |
| Polyethylene-HD | 32 | 10× CMC | 93.6 |
| Nylon | 31.5 | 10× CMC | 50 |
| Polyethylene terephthalate | 38.4 | 10× CMC | 65.3 |

Example 2a

Synthesis of dodecyl 6-(dimethylamino)hexanoate N-oxide (Surfactant 2)

6-(Dimethylamino)hexanoic acid (11.99 g, 75.36 mmol) was dissolved in toluene (50 mL) in a round bottom flask equipped with a Dean-Stark trap. Dodecanol (12.68 g, 75.36 mmol) and p-toluene sulfonic acid monohydrate (PTSA) (14.33 g, 75.36 mmol) were then added. The reaction was heated to reflux for 24 hours, until no further water was noted in the Dean-Stark trap. The solvent was removed under vacuum and the resultant solid was washed with hexanes. The solid was dissolved in dichloromethane (200 mL) and washed with saturated sodium carbonate to give dodecyl 6-(dimethylamino)hexanoate in 51% yield. $^{1}$H NMR (DMSO) δ 4.00 (t, J=6.5 Hz, 2H), 2.27 (t, J=7.3 Hz, 2H), 2.13-2.16 (m, 2H), 2.01 (s, 6H), 1.54-1.53 (m, 6H), 1.27-1.18 (m, 20H), 0.86 (t, 3H).

Dodecyl 6-(dimethylamino)hexanoate (1.0 g, 3.05 mmol) was dissolved in distilled water (80 mL). Hydrogen peroxide (50% solution, 1.04 g, 30.5 mmol) was added. The reaction was heated at reflux for 12 hours, then the solvent was removed under vacuum. The resultant solid was washed with acetone to give the desired N-oxide in 90% yield. $^{1}$H NMR (500 MHz, DMSO) δ 4.00 (t, J=6.6 Hz, 2H), 3.30-3.26 (m, 2H), 3.18 (s, 6H), 2.31 (t, J=7.4 Hz, 2H), 1.76-1.73 (m, 2H), 1.54-1.57 (m, 4H), 1.30-1.24 (m, 22H), 0.86 (t, J=6.9 Hz, 3H).

Example 2b

Determination of Critical Micelle Concentration (CMC) of Surfactant 2

Figure 3:
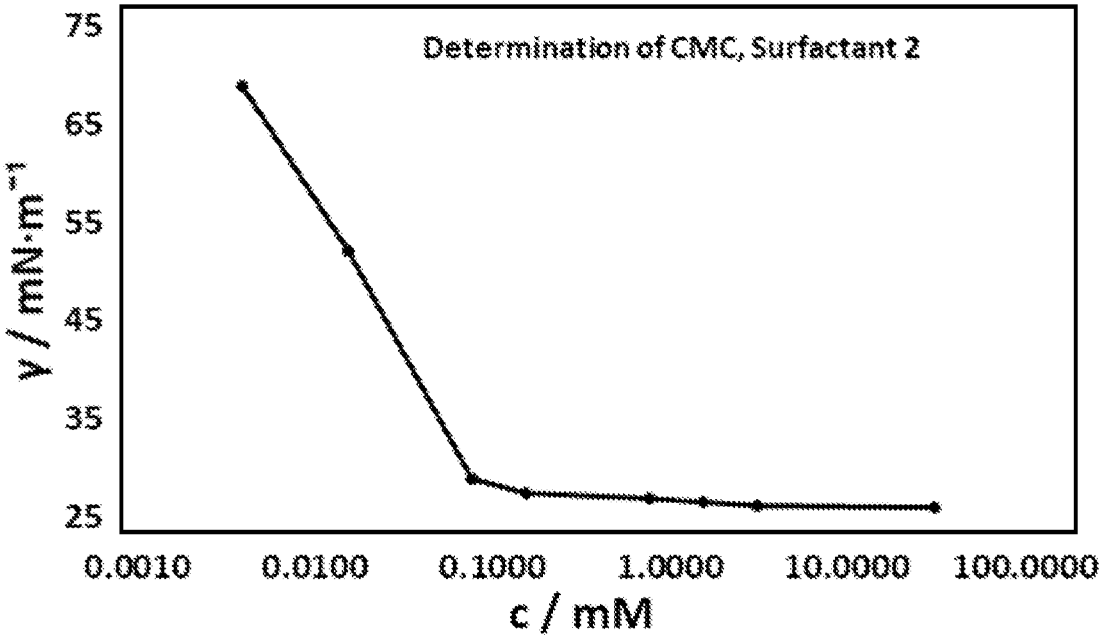
FIG. 3 shows a plot of surface tension versus concentration for Surfactant 2 measured at pH=7 as described in Example 2b, wherein the Y axis depicts the surface tension (γ) in millinewtons per meter (mN/m) and the X axis depicts the concentration (c) in millimoles (mM).

The critical micelle concentration (CMC) was tested. From the change in surface tension with concentration in water, the CMC was determined to be about 0.08 mmol. The plateau value of minimum surface tension that can be reached by this surfactant is about 28 mN/m, namely 28 mN/m±2.8 mN/m. FIG. 3 is a plot of these results, showing surface tension versus concentration. From the plot of the results, the surface tension at the CMC is equal to or less than about 30 mN/m. The plot further shows surface tension of equal to or less than 30 mN/m at a concentration of 0.08 mmol or greater.

Example 2c

Determination of Dynamic Surface Tension of Surfactant 2

Figure 4:
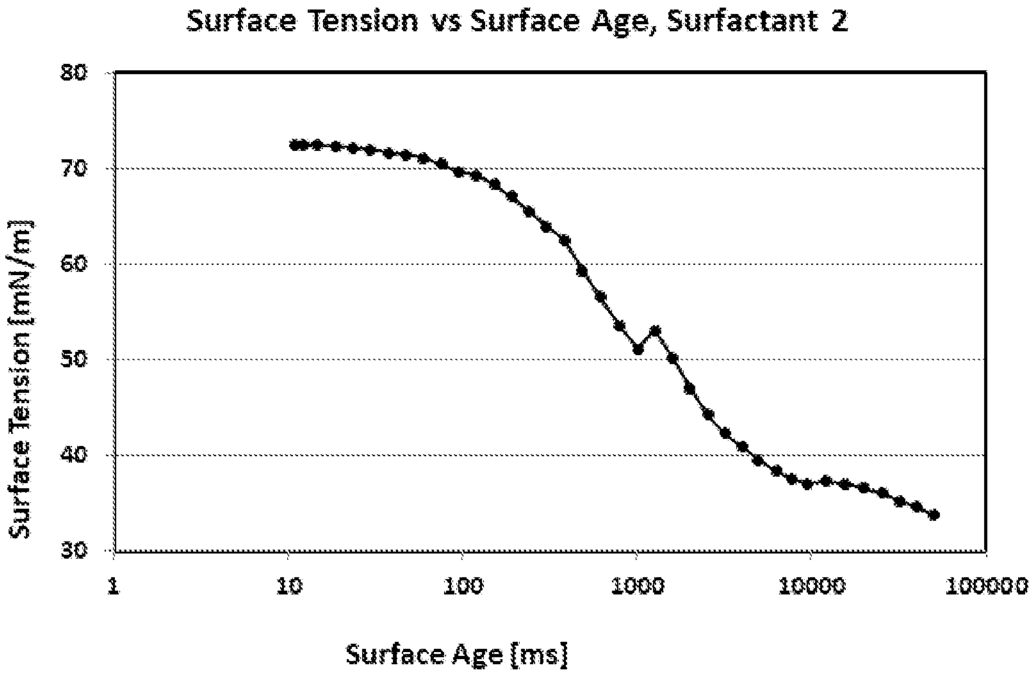
FIG. 4 shows a plot of dynamic surface tension as change in surface tension versus time for Surfactant 2 as described in Example 2c, wherein the Y axis depicts the surface tension in millinewtons per meter (mN/m) and the X axis depicts the surface age in milliseconds (ms).

The dynamic surface tension was determined with a bubble pressure tensiometer which measures the change of surface tension of a freshly created air-water interface with time. FIG. 4 presents a plot of the surface tension versus time, showing that the compound fully saturated the surface in approximately 7.6 seconds. As can be seen in the plot, the dynamic surface tension is equal to or less than 40 mN/m at a surface age of 4900 ms or greater.

Example 2d

Determination of Wetting Properties of Surfactant 2

In addition to surface tension and surface dynamics, the wetting properties of the compound were tested on various surfaces. For example, hydrophobic substrates such as polyethylene-HD exhibit surface wetting with a contact angle of 39.3°, much lower than that of water. On oleophobic and hydrophobic substrates such as Teflon, the measured contact angle was much less than that of water, 57.4° (Table 3).

TABLE 3

| Substrate | CA of Surfactant (°) | Concentration | CA of water (°) |
|---|---|---|---|
| Teflon | 57.4 | 10× CMC | 119 |
| Polyethylene-HD | 39.3 | 10× CMC | 93.6 |
| Nylon | 21.7 | 10× CMC | 50 |
| Polyethylene terephthalate | 24.5 | 10× CMC | 65.3 |

Example 3a

Synthesis of 6-(dodecyloxy)-N,N-dimethyl-6-oxo-hexan-1-aminium chloride (Surfactant 3)

6-(Dimethylamino)hexanoic acid (11.99 g, 75.36 mmol) was dissolved in toluene (50 mL) in a round bottom flask equipped with a Dean-Stark trap. Dodecanol (12.68 g, 75.36 mmol) and p-toluene sulfonic acid monohydrate (PTSA) (14.33 g, 75.36 mmol) were then added. The reaction was heated to reflux for 24 hours, until no further water was noted in the Dean-Stark trap. The solvent was removed under vacuum and the resultant solid was washed with hexanes. The solid was dissolved in dichloromethane (200 mL) and washed with saturated sodium carbonate to give dodecyl 6-(dimethylamino)hexanoate in 51% yield. 1H NMR (DMSO) δ 4.00 (t, J=6.5 Hz, 2H), 2.27 (t, J=7.3 Hz, 2H), 2.13-2.16 (m, 2H), 2.01 (s, 6H), 1.54-1.53 (m, 6H), 1.27-1.18 (m, 20H), 0.86 (t, 3H).

Dodecyl 6-(dimethylamino)hexanoate (100 mg, 0.305 mmol) was dissolved in water (10 mL). Concentrated hydrochloric acid (11.14 mg, 0.305 mmol) was added.

Example 3b

Determination of Critical Micelle Concentration (CMC) of Surfactant 3

Figure 5:
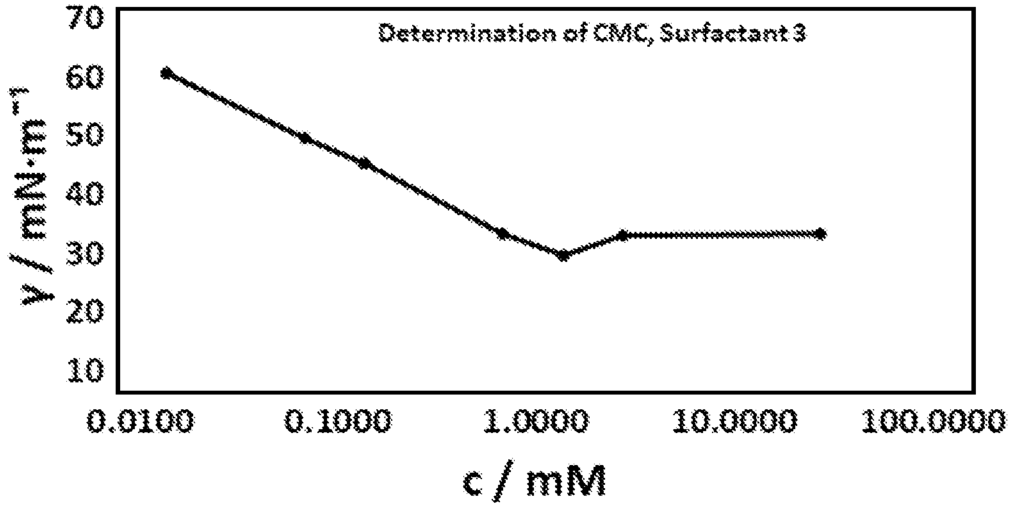
FIG. 5 shows a plot of surface tension versus concentration for Surfactant 3 measured at pH=7 as described in Example 3b, wherein the Y axis depicts the surface tension (γ) in millinewtons per meter (mN/m) and the X axis depicts the concentration (c) in millimoles (mM).

The critical micelle concentration (CMC) was tested. From the change in surface tension with concentration in water, the CMC was determined to be about 1.4 mmol. The plateau value of minimum surface tension that can be reached by this surfactant is about 30 mN/m, namely 30 mN/m±3 mN/m. FIG. 5 is a plot of these results, showing surface tension versus concentration. From the plot of the results, the surface tension at the CMC is equal to or less than about 30 mN/m. The plot further shows the surface tension to be equal to or less than 33 mN/m at a concentration of 2.7 mmol or greater.

Example 3c

Determination of Dynamic Surface Tension of Surfactant 3

Figure 6:
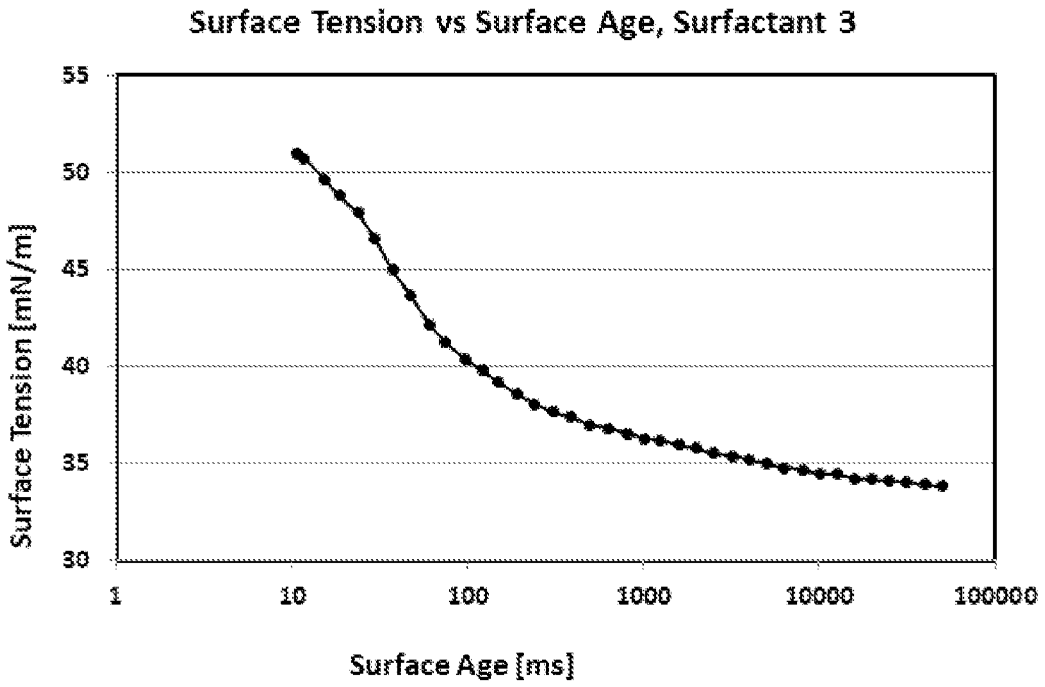
FIG. 6 shows a plot of dynamic surface tension as change in surface tension versus time for Surfactant 3 as described in Example 3c, wherein the Y axis depicts the surface tension in millinewtons per meter (mN/m) and the X axis depicts the surface age in milliseconds (ms).

The dynamic surface tension was determined with a bubble pressure tensiometer which measures the change of surface tension of a freshly created air-water interface with time. FIG. 6 presents a plot of the surface tension versus time, showing that surface tension in the time interval between 1 and 100 ms drops rapidly from about 50 mN/m to about 40 mN/m. In the time interval from 100 to 50,000 ms, the surface tension drops slowly from 40 mN/m to about 34 mN/m, approaching asymptotically the saturation value of the surface tension at the CMC.

Example 3d

Determination of Wetting Properties of Surfactant 3

In addition to surface tension and surface dynamics, the wetting properties of the compound were tested on various surfaces. For example, hydrophobic substrates such as polyethylene-HD exhibit surface wetting with a contact angle of 42.5°. On oleophobic and hydrophobic substrates such as Teflon, the measured contact angle was much less than that of water, 66.6° (Table 4).

TABLE 4

| Substrate | CA of Surfactant (°) | Concentration | CA of water (°) |
|---|---|---|---|
| Teflon | 66.6 | 10× CMC | 119 |
| Polyethylene-HD | 42.5 | 10× CMC | 93.6 |
| Nylon | 15 | 10× CMC | 50 |
| Polyethylene terephthalate | 18.3 | 10× CMC | 65.3 |

Example 4a

Synthesis of 4-((6-(dodecyloxy)-6-oxohexyl)dimethylammonio)butane-1-sulfonate (Surfactant 4)

6-(Dimethylamino)hexanoic acid (11.99 g, 75.36 mmol) was dissolved in toluene (50 mL) in a round bottom flask equipped with a Dean-Stark trap. Dodecanol (12.68 g, 75.36 mmol) and p-toluene sulfonic acid monohydrate (PTSA) (14.33 g, 75.36 mmol) were then added. The reaction was heated to reflux for 24 hours, until no further water was noted in the Dean-Stark trap. The solvent was removed under vacuum and the resultant solid was washed with hexanes. The solid was dissolved in dichloromethane (200 mL) and washed with saturated sodium carbonate to give dodecyl 6-(dimethylamino)hexanoate in 51% yield. 1H NMR (DMSO) δ 4.00 (t, J=6.5 Hz, 2H), 2.27 (t, J=7.3 Hz, 2H), 2.13-2.16 (m, 2H), 2.01 (s, 6H), 1.54-1.53 (m, 6H), 1.27-1.18 (m, 20H), 0.86 (t, 3H).

Dodecyl 6-(dimethylamino)hexanoate (1.0 g, 3.05 mmol) was dissolved in ethyl acetate (30 mL). 1,4-Butanesultone (0.62 g, 4.57 mmol) was then added, and the mixture was heated to reflux for 12 hours. The reaction was cooled to room temperature, and the solvent was removed under vacuum. 1H NMR (DMSO) δ 4.00 (t, J=6.7 Hz, 2H), 3.29-3.15 (m, 4H), 2.97 (s, 6H), 2.47 (t, J=7.4 Hz, 2H), 2.33 (t, J=7.4 Hz, 2H), 1.81-1.70 (m, 2H), 1.66-1.55 (m, 6H), 1.32-1.23 (m, 20H), 0.86 (t, J=6.9 Hz, 3H).

Example 4b

Determination of Critical Micelle Concentration (CMC) of Surfactant 4

Figure 7:
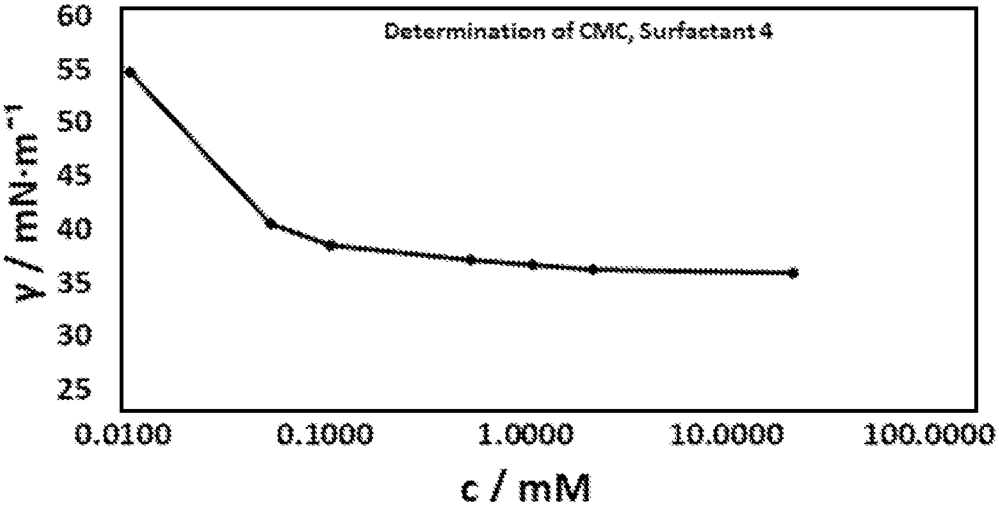
FIG. 7 shows a plot of surface tension versus concentration for Surfactant 4 measured at pH=7 as described in Example 4b, wherein the Y axis depicts the surface tension (γ) in millinewtons per meter (mN/m) and the X axis depicts the concentration (c) in millimoles (mM).

The critical micelle concentration (CMC) was tested. From the change in surface tension with concentration in water, the CMC was determined to be about 0.1 mmol. The plateau value of minimum surface tension that can be reached by this surfactant is about 38 mN/m, namely 38 mN/m±3.8 mN/m. FIG. 7 is a plot of these results, showing surface tension versus concentration. From the plot of the results, the surface tension at the CMC is about 38 mN/m, and the surface tension is equal to or less than 37 mN/m at a concentration of 1 mmol or greater.

Example 4c

Determination of Dynamic Surface Tension of Surfactant 4

Figure 8:
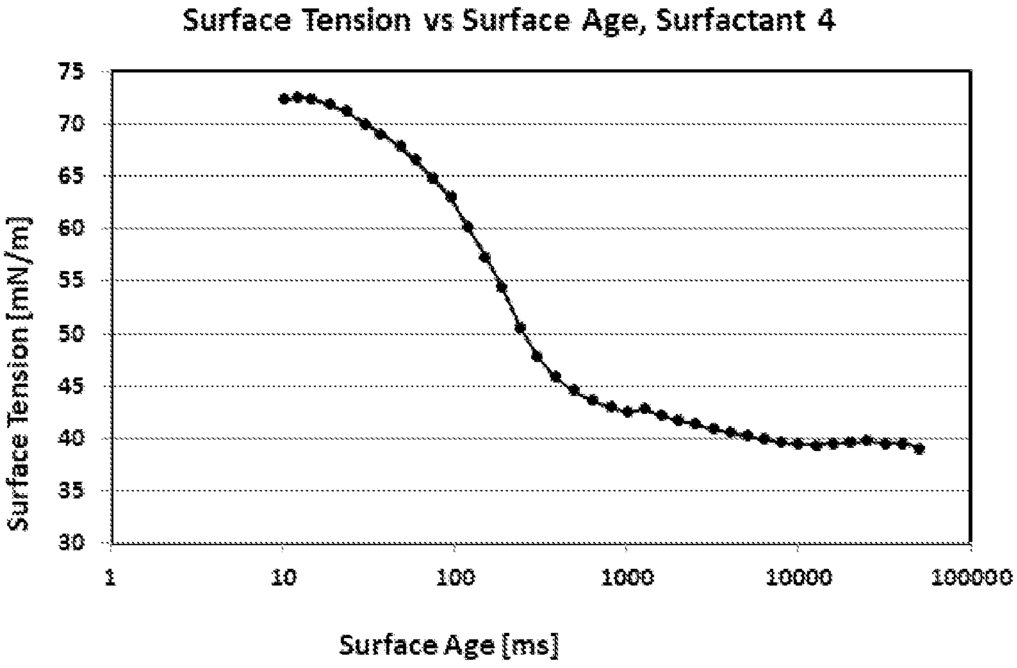
FIG. 8 shows a plot of dynamic surface tension as change in surface tension versus time for Surfactant 4 as described in Example 4c, wherein the Y axis depicts the surface tension in millinewtons per meter (mN/m) and the X axis depicts the surface age in milliseconds (ms).

The dynamic surface tension was determined with a bubble pressure tensiometer which measures the change of surface tension of a freshly created air-water interface with time. FIG. 8 presents a plot of the surface tension versus time, showing that the compound fully saturated the surface in approximately 1 second. From the plot, the dynamic surface tension is equal to or less than 40.5 mN/m at a surface age of 4000 ms or greater.

Example 4d

Determination of Wetting Properties of Surfactant 4

In addition to surface tension and surface dynamics, the wetting properties of the compound were tested on various surfaces. For example, hydrophobic substrates such as polyethylene-HD exhibit surface wetting with a contact angle of 46.5°. On oleophobic and hydrophobic substrates such as Teflon, the measured contact angle was much less than that of water, 62.7° (Table 5).

TABLE 5

| Substrate | CA of Surfactant (°) | Concentration | CA of water (°) |
|---|---|---|---|
| Teflon | 62.7 | 10× CMC | 119 |
| Polyethylene-HD | 46.5 | 10× CMC | 93.6 |
| Nylon | 25.7 | 10× CMC | 50 |
| Polyethylene terephthalate | 35.6 | 10× CMC | 65.3 |

Example 5a

Synthesis of 6-(dodecyloxy)-6-oxohexan-1-aminium chloride (Surfactant 5)

6-Aminohexanoic acid (5.0 g, 38.11 mmol) was dissolved in toluene (50 mL) in a round bottom flask equipped with a Dean-Stark trap. Dodecanol (6.41 g, 38.11 mmol) and p-toluene sulfonic acid monohydrate (PTSA) (7.24 g, 38.11 mmol) were then added. The reaction was heated to reflux for 24 hours, until no further water was noted in the Dean-Stark trap. The solvent was removed under vacuum and the resultant solid was washed with hexanes. The solid was dissolved in dichloromethane (200 mL) and washed with saturated sodium carbonate to give dodecyl 6-aminohexanoate in 40% yield.

Dodecyl 6-aminohexanoate (100 mg, 0.363 mmol) was dissolved in water (10 mL). Concentrated hydrochloric acid (13.23 mg, 0.363 mmol) was then added.

Example 5b

Determination of Critical Micelle Concentration (CMC) of Surfactant 5

Figure 9:
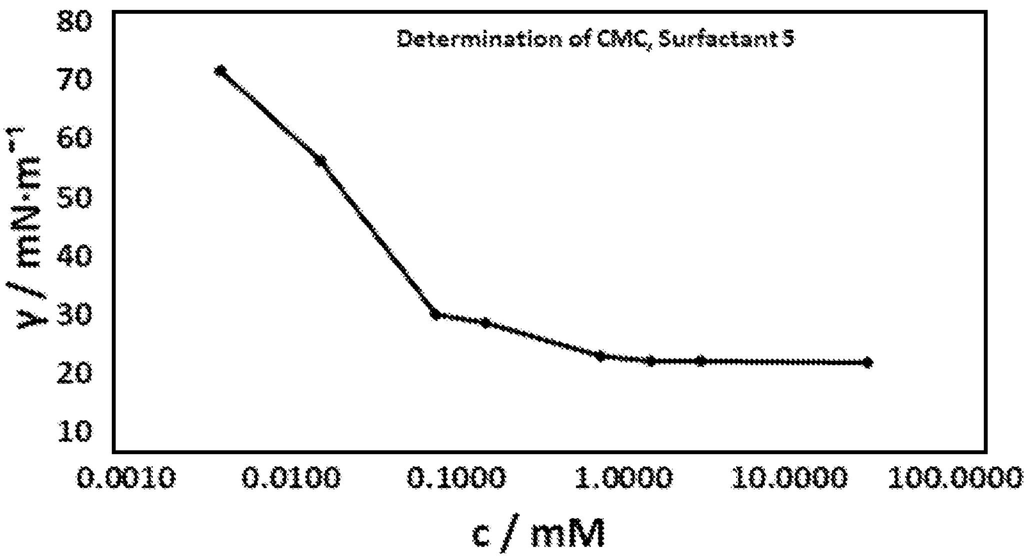
FIG. 9 shows a plot of surface tension versus concentration for Surfactant 5 measured at pH=7 as described in Example 5b, wherein the Y axis depicts the surface tension (γ) in millinewtons per meter (mN/m) and the X axis depicts the concentration (c) in millimoles (mM).

The critical micelle concentration (CMC) was tested. From the change in surface tension with concentration in water, the CMC was determined to be about 0.75 mmol. The plateau value of minimum surface tension that can be reached by this surfactant is about 23 mN/m, namely 23 mN/m±2.3 mN/m. FIG. 9 is a plot of these results, showing surface tension versus concentration. From the plot of the results, the surface tension at the CMC is about 23 mN/m, and surface tension is equal to or less than 23.2 mN/m at a concentration of 0.7 mmol or greater.

Example 5c

Determination of Dynamic Surface Tension of Surfactant 5

Figure 10:
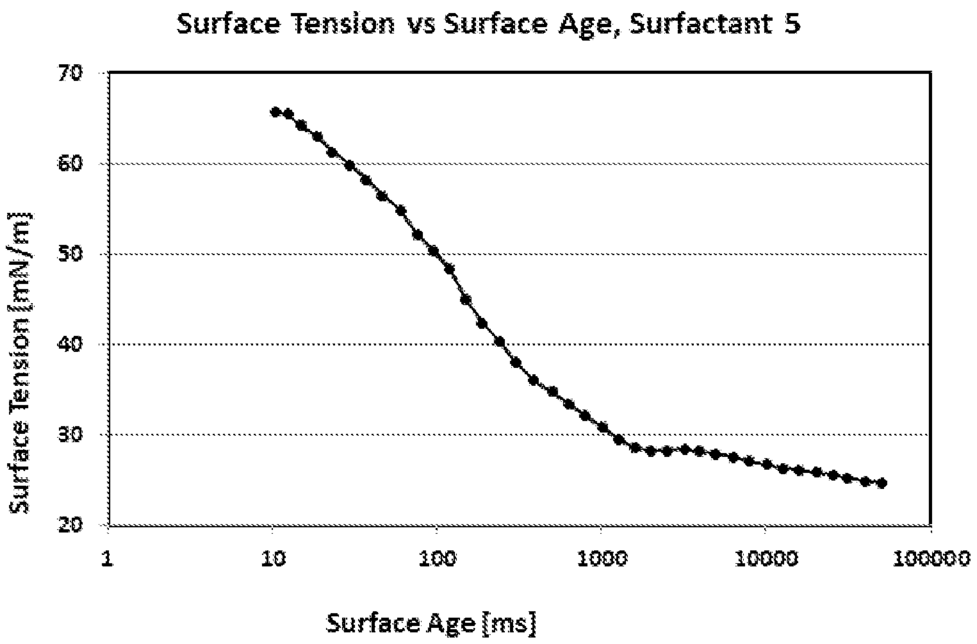
FIG. 10 shows a plot of dynamic surface tension as change in surface tension versus time for Surfactant 5 as described in Example 5c, wherein the Y axis depicts the surface tension in millinewtons per meter (mN/m) and the X axis depicts the surface age in milliseconds (ms).

The dynamic surface tension was determined with a bubble pressure tensiometer which measures the change of surface tension of a freshly created air-water interface with time. FIG. 10 shows a plot of the results as surface tension versus time, showing that the compound fully saturated the surface in approximately 1.5 seconds. From the plot, the dynamic surface tension is equal to or less than 28.5 mN/m at a surface age of 3185 ms or greater.

Example 5d

Determination of Wetting Properties of Surfactant 5

In addition to surface tension and surface dynamics, the wetting properties of the compound were tested on various surfaces. For example, hydrophobic substrates such as polyethylene-HD exhibit surface wetting with a very low contact angle of 16.6°. On oleophobic and hydrophobic substrates such as Teflon, the measured contact angle was much less than that of water, 39.3° (Table 6).

TABLE 6

| Substrate | CA of Surfactant (°) | Concentration | CA of water (°) |
|---|---|---|---|
| Teflon | 39.3 | 10× CMC | 119 |
| Polyethylene-HD | 16.6 | 10× CMC | 93.6 |

TABLE 6-continued

| Substrate | CA of Surfactant (°) | Concentration | CA of water (°) |
|---|---|---|---|
| Nylon | 18.2 | 10× CMC | 50 |
| Polyethylene terephthalate | 15.3 | 10× CMC | 65.3 |

Example 6

Soaps Comprising 2 or More Inventive Surfactants

Detergent formulation comprising the soap, fully saturated lauric soap granule based on Prifac 5808 from Uniqema, a first inventive surfactant, and a non-ionic inventive surfactant, wherein the surfactants may be one or more of Surfactants 1-5 described herein. All formulations include 1.008 g/l of surfactant; and 0.25 to 0.67 of soap. The water was conditioned with a mixture of $CaCl_2 \cdot 2H_2O$) and $MgCl_2 \cdot H_2O$), such that the ratio of calcium ions to magnesium ions is 4:1.

Example 8

Dry Cleaning Formulations

Laundry articles are contacted with low aqueous dry cleaning compositions, including a surfactant, which may be one or more of Surfactants 1-5 described herein. The articles are agitated for 15 minutes at 20° C. using a liquid to cloth ratio of 13.

Subsequently, the dry cleaning composition is removed and the laundry articles are rinsed with a rinse composition comprising clean dry cleaning solvent. The experiment is repeated with the low aqueous dry cleaning compositions shown below in Table 7, using an liquid to cloth ratio of 5. The non-aqueous solvent used may be HFE-7200™ (a mixture of ethyl nonafluoroisobutyl ether and ethyl nonafluorobutyl ether which may be obtained from 3M), dodecamethyl pentasiloxane, decamethyl tetrasiloxane, decamethyl cyclopentasiloxane, or a mixture thereof.

TABLE 7

| Component | Function | Weight % |
|---|---|---|
| Surfactant | Surfactant | 0-1 |
| Co-Surfactant | Surfactant | 0-1 |
| HFE-7200 ™ | Solvent | 0-98 |
| Dodecamethyl pentasiloxane | Solvent | 0-98 |
| Decamethyl tetrasiloxane | Solvent | 0-98 |
| Decamethyl cyclopentasiloxane | Solvent | 0-98 |

ASPECTS

A first aspect of the invention includes formulations for cleaning, comprising: at least one surfactant of Formula I, Formula I

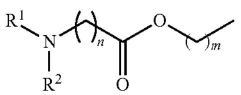

wherein $R^1$ and $R^2$ may be the same or different, and may be selected from the group consisting of hydrogen and $C_1$-$C_6$ alkyl, wherein the $C_1$-$C_6$ alkyl may optionally be substituted with one or more substituents selected from the group consisting of hydroxyl, amino, amido, sulfonyl, sulfonate, carbonyl, carboxyl, and carboxylate; n is an integer from 2 to 5 (including 2 and 5); m is an integer from 9 to 20 (including 9 and 20); the terminal nitrogen is optionally further substituted with $R^3$ wherein $R^3$ is selected from the group consisting of hydrogen, oxygen, hydroxyl, and $C_1$-$C_6$ alkyl, wherein the $C_1$-$C_6$ alkyl may optionally be substituted with one or more substituents selected from the group consisting of hydroxyl, amino, amido, sulfonyl, sulfonate, carbonyl, carboxyl, and carboxylate; an optional counterion associated with the compound which, if present, is selected from the group consisting of chloride, bromide, iodide, and hydroxide; and at least one detergent and/or at least one soap.

A second Aspect of the invention includes the first Aspect of the invention, wherein the at least one detergent or soap is selected from the group consisting of: anionic detergents, cationic detergents, non-ionic detergents, and zwitterionic detergents.

A third Aspect of the invention includes the First Aspect and the Second Aspects of the invention, wherein the soap is of the general formula: (RCO2-)n Mn+ wherein R includes an alkly group, M is a metal, and n+ is either +1 or +2.

A fourth Aspect of the invention includes the first through the third Aspects of the invention, further comprising: at least one builder.

A fifth Aspect of the invention includes the first through the fourth Aspects of the invention, wherein the at least one builder is at least one compound selected from the group consisting of: tripolyphosphates, nitrilloacetic acid salts, zeolites, calcite/carbonate, citrate or polymers, sodium, pyrophosphate, orthophosphate, sodium aluminosilicate, inorganic salts of alkaline agents, inorganic salts of alkali metals, sulfates, silicates, and metasilicates.

phophates, persilicates, persulfates, sodium hypochlorite, chlorine dioxide, hydrogen peroxide, sodium percarbonate, sodium perborate, peroxoacetic acid, benzol peroxide, potassium persulfate, potassium permanganate, sodium dithionite An eighth Aspect of the invention includes the first through the seventh Aspects of the invention further comprising: at least one enzyme.

A ninth Aspect of the invention includes the eighth Aspect of the invention where the at least one enzyme is selected from the group consisting of: proteases, amylases, cellulases, oxidases, mannanases, peroxidases and lipases.

A tenth Aspect of the invention includes the first through the ninth Aspects of the invention further comprising at least one polymer.

An eleventh Aspect of the invention includes the tenth Aspect of the invention, wherein the at least one polymer is at least one compound selected from the group consisting of: polymers of methacrylamidem; polymers of ethylenically unsaturated monomer: N,N-dialkylaminoalkyl methacrylate, N,N-dialkylaminoalkyl acrylate, N,N-dialkylaminoalkyl acrylamide, N,N-dialkylaminoalkylmethacrylamide, methacylamidoalkyl trialkylammonium salts, acrylamidoalkylltrialkylamminium salts, vinylamine, vinyl imidazole, quaternized vinyl imidazole and diallyl dialkyl ammonium salts, polymers of: diallyl dimethyl ammonium salt, N,N-dimethylaminoethyl acrylate, N,N-dimethyl amino ethyl methacrylate, [2-(methacryloylamino) ethyl]trimethylammonium salts, N,N-dimethylaminopropyl acrylamide, N,N-dimethylaminopropyl methacrylamide, acrylamidopropyl trimethyl ammonium salts, methacrylamidopropyl trimethylammonium salts, and quaternized vinylimidazole.

A twelfth Aspect of the invention includes the first through eleventh Aspects of the invention, wherein the surfactant is 6-(dodecyloxy)-N,N,N-trimethyl-6-oxohexan-1-aminium iodide, having the following formula:

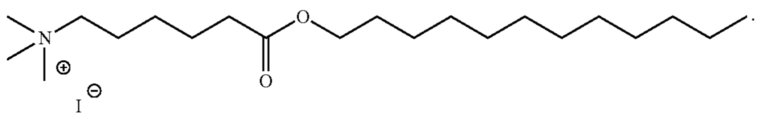

A sixth Aspect of the invention includes the first through the fifth Aspects of the invention further comprising: at least one bleach.

A thirteenth Aspect of the invention includes the first through eleventh Aspects of the invention, wherein the surfactant is dodecyl 6-(dimethylamino)hexanoate N-oxide, having the following formula:

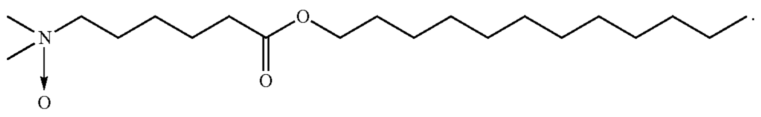

A seventh Aspect of the invention includes the sixth Aspect of the invention, wherein the at least one bleach at is at least one compound selected from the group consisting of: metal borates, persalts, peroxyacids, percarbonates, per- A fourteenth Aspect of the invention includes the first through eleventh Aspects of the invention, wherein the surfactant is 6-(dodecyloxy)-N,N-dimethyl-6-oxohexan-1-aminium chloride, having the following formula:

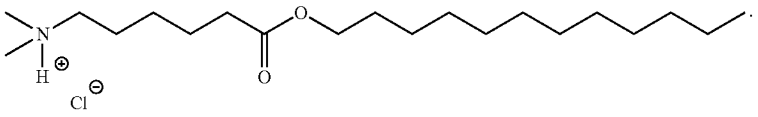

A fifteenth Aspect of the invention includes the first through eleventh Aspects of the invention, wherein the surfactant is 4-((6-(dodecyloxy)-6-oxohexyl)dimethylammonio)butane-1-sulfonate, having the following formula:

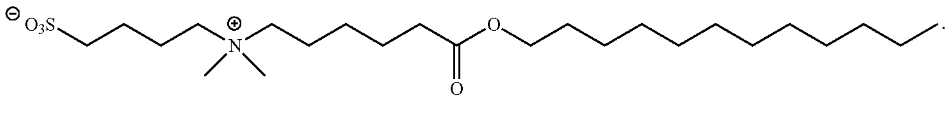

A sixteenth Aspect of the invention includes the first through eleventh Aspects of the invention, wherein the surfactant is 6-(dodecyloxy)-6-oxohexan-1-aminium chloride, having the following formula:

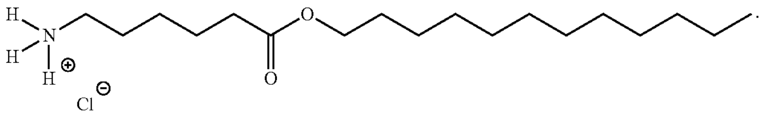

A seventeenth Aspect of the invention comprises at least one formulation for dry cleaning, comprising: at least one surfactant of Formula I, Formula I

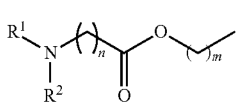

wherein $R^1$ and $R^2$ may be the same or different, and may be selected from the group consisting of hydrogen and $C_1$-$C_6$ alkyl, wherein the $C_1$-$C_6$ alkyl may optionally be substituted with one or more substituents selected from the group consisting of hydroxyl, amino, amido, sulfonyl, sulfonate, carbonyl, carboxyl, and carboxylate; n is an integer from 2 to 5 (including 2 and 5); m is an integer from 9 to 20 (including 9 and 20); the terminal nitrogen is optionally further substituted with $R^3$, wherein $R^3$ is selected from the group consisting of hydrogen, oxygen, hydroxyl, and $C_1$-$C_6$ alkyl, wherein the $C_1$-$C_6$ alkyl may optionally be substituted with one or more substituents selected from the group consisting of hydroxyl, amino, amido, sulfonyl, sulfonate, carbonyl, carboxyl, and carboxylate; an optional counterion associated with the compound which, if present, is selected from the group consisting of chloride, bromide, iodide, and hydroxide; and at least one solvent.

An eighteenth Aspect of the invention incudes the seventeenth Aspect of the invention, wherein the at least one solvent is at least one compound selected from the group consisting of: perchloroethylene, hydrocarbons, trichloroethylene, decamethylcyclopentasiloxane, dibutoxymthane, n-propyl bromide.

A nineteenth Aspect of the invention includes the seventeenth and the eighteenth Aspect of the invention further comprising at least one co-solvent.

A twentieth Aspect of the invention includes the nineteenth Aspect of the invention wherein the at least one co-solvent is at least one compound selected from the group consisting of: alcohols, ethers, glycol ethers, alkanes, alkenes, linear and cyclic amides, perfluorinated tertiary amines, perfluoroethers, cycloalkanes, esters, ketones, aromatics, methanol, ethanol, isopropanol, t-butyl alcohol, trifluoroethanol, pentafluoropropanol, hexafluoro-2-propanol, methyl t-butyl ether, methyl t-amyl ether, propylene glycol n-propyl ether, propylene glycol n-butyl ether, dipropylene glycol n-butyl ether, propylene glycol methyl ether, ethylene glycol monobutyl ether, trans-1,2-dichloroethylene, decalin, methyl decanoate, t-butyl acetate, ethyl acetate, glycol methyl ether acetate, ethyl lactate, diethyl phthalate, 2-butanone, N-alkyl pyrrolidone (such as N-methyl pyrrolidone, N-ethyl pyrrolidone), methyl isobutyl ketone, naphthalene, toluene, trifluorotoluene, perfluorohexane, perfluoroheptane, perfluorooctane, perfluorotributylamine, perfluoro-2-butyloxacyclopentane.

A twenty-first Aspect of the invention includes the seventeenth through nineteenth Aspects of the invention, wherein the surfactant is 6-(dodecyloxy)-N,N,N-trimethyl-6-oxohexan-1-aminium iodide, having the following formula:

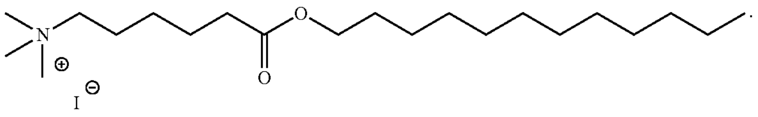

A twenty-second Aspect of the invention includes the seventeenth through nineteenth Aspects of the invention, wherein the surfactant is dodecyl 6-(dimethylamino)hexanoate N-oxide, having the following formula:

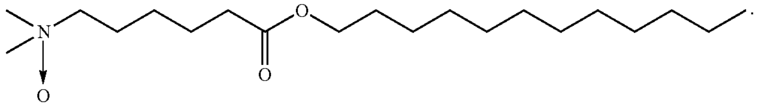

A twenty-third Aspect of the invention includes the seventeenth through nineteenth Aspects of the invention, wherein the surfactant is 6-(dodecyloxy)-N,N-dimethyl-6-oxohexan-1-aminium chloride, having the following formula:

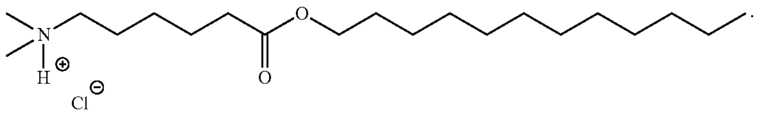

A twenty-fourth Aspect of the invention includes the seventeenth through nineteenth Aspects of the invention, wherein the surfactant is 4-((6-(dodecyloxy)-6-oxohexyl)dimethylammonio)butane-1-sulfonate, having the following formula:

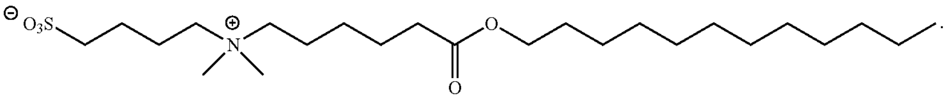

A twenty-fifth Aspect of the invention includes the seventeenth through nineteenth Aspects of the invention, wherein the surfactant is 6-(dodecyloxy)-6-oxohexan-1-aminium chloride, having the following formula:

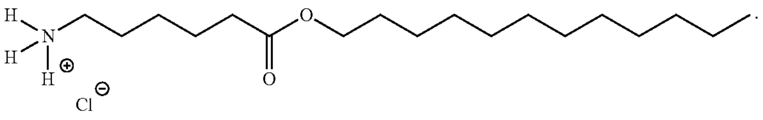

A twenty-sixth Aspect of the invention includes the first through eleventh Aspects of the invention, wherein the surfactant comprises at least one of 6-(dodecyloxy)-N,N,N-trimethyl-6-oxohexan-1-aminium iodide, having the following formula:

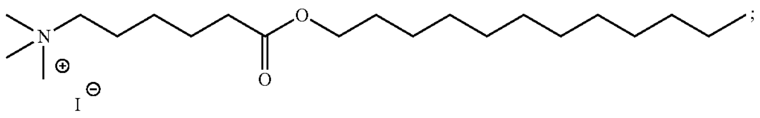

6-(dimethylamino)hexanoate N-oxide, having the following formula:

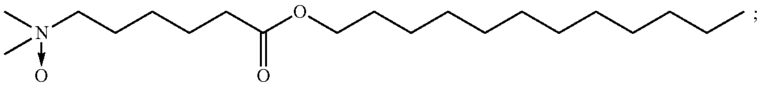 [SMILES: CCCCCCCCCCCCOC(=O)CCCCC[N+](C)(C)[O-]]

6-(dodecyloxy)-N,N-dimethyl-6-oxohexan-1-aminium chloride, having the following formula:

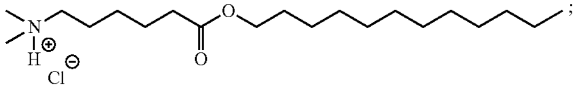

4-((6-(dodecyloxy)-6-oxohexyl)dimethylammonio)butane-1-sulfonate, having the following formula:

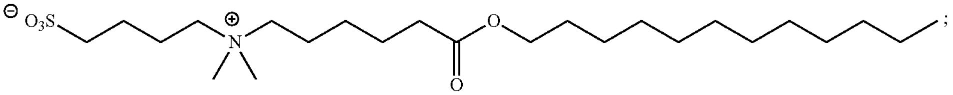

6-(dodecyloxy)-6-oxohexan-1-aminium chloride, having the following formula:

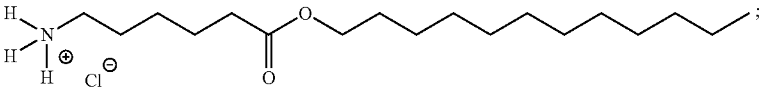

and combinations thereof.

A twenty-seventh Aspect of the invention includes the seventeenth through twentieth Aspects of the invention, wherein the surfactant comprises at least one of 6-(dodecyloxy)-N,N,N-trimethyl-6-oxohexan-1-aminium iodide, having the following formula:

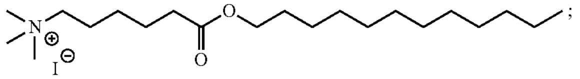 [SMILES: CCCCCCCCCCCCOC(=O)CCCCC[N+](C)(C)C ; [I-]]

6-(dimethylamino)hexanoate N-oxide, having the following formula:

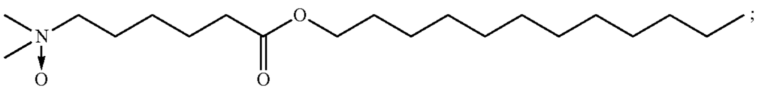 [SMILES: CCCCCCCCCCCCOC(=O)CCCCC[N+](C)(C)[O-]]

6-(dodecyloxy)-N,N-dimethyl-6-oxohexan-1-aminium chloride, having the following formula:

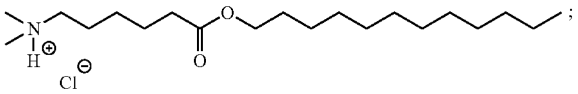

4-((6-(dodecyloxy)-6-oxohexyl)dimethylammonio)butane-1-sulfonate, having the following formula:

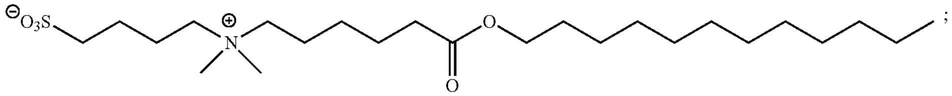

6-(dodecyloxy)-6-oxohexan-1-aminium chloride, having the following formula:

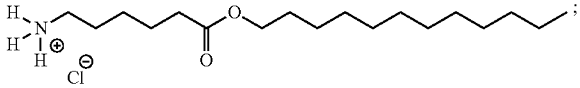

and combinations thereof.

The invention claimed is:

1. A formulation for cleaning comprising:

at least one surfactant comprising at least one of 6-(dodecyloxy)-dimethylamino hexanoate N-oxide having the following formula:

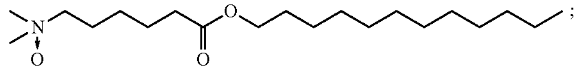 [SMILES: CCCCCCCCCCCCOC(=O)CCCCC[N+](C)(C)[O-]]

6-(dodecyloxy)-N,N-dimethyl-6-oxohexan-1-aminium chloride having the following formula:

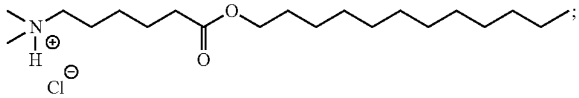 [SMILES: CCCCCCCCCCCCOC(=O)CCCCC[NH+](C)C ; [Cl-]]

and combinations thereof; and at least one detergent or at least one soap.

2. The formulation according to claim 1, wherein the at least one detergent is selected from the group consisting of anionic detergents, cationic detergents, non-ionic detergents, and zwitterionic detergents.

3. The formulation according to claim 1, wherein the at least one soap is of the general formula:

$$(RCO_2')_nM^{n+}$$

wherein R includes an alkyl group, M is a metal, n+ is either +1 or +2, and n is either 1 or 2, respectively.

4. The formulation according to claim 1, further comprising at least one builder.

5. The formulation according to claim 4, wherein the at least one builder is at least one compound selected from the group consisting of tripolyphosphates, nitriloacetic acid salts, zeolites, calcite/carbonate, citrate, polymer builders, sodium pyrophosphate, orthophosphate, sodium aluminosilicate, inorganic salts of alkaline agents, inorganic salts of alkali metals, sulfates, silicates, and metasilicates.

6. The formulation according to claim 1, further comprising at least one bleach.

7. The formulation according to claim 6, wherein the at least one bleach at is at least one compound selected from the group consisting of metal borates, persalts, peroxyacids, percarbonates, perphosphates, persilicates, persulfates, sodium hypochlorite, chlorine dioxide, hydrogen peroxide, sodium percarbonate, sodium perborate, peroxoacetic acid, benzoyl peroxide, potassium persulfate, potassium permanganate, sodium dithionite.

8. The formulation according to claim 1, further comprising at least one enzyme.

9. The formulation according to claim 8, where the at least one enzyme is selected from the group consisting of proteases, amylases, cellulases, oxidases, mannanases, peroxidases and lipases.

10. The formulation according to claim 1 further comprising at least one polymer.

11. The formulation according to claim 10, wherein the at least one polymer is at least one compound selected from the group consisting of polymers of methacrylamide; polymers of ethylenically unsaturated monomer: N,N-dialkylaminoalkyl methacrylate, N,N-dialkylaminoalkyl acrylate, N,N-dialkylaminoalkyl acrylamide, N,N-dialkylaminoalkylmethacrylamide, methacrylamidoalkyl trialkylammonium salts, acrylamidoalkyltrialkylammonium salts, vinylamine, vinyl imidazole, and diallyl dialkyl ammonium salts, polymers of: diallyl dimethyl ammonium salt, N,N-dimethyl aminoethyl acrylate, N,N-dimethyl amino ethyl methacrylate, [2-(ethacryloylamino)ethyl] trimethylammonium salts, N,N-dimethylaminopropyl acrylamide, N,N-dimethylaminopropyl methacrylamide, acrylamidopropyl trimethyl ammonium salts, methacrylamidopropyl trimethylammonium salts, and quaternized vinylimidazole.

12. A formulation for dry cleaning comprising:

at least one surfactant comprising at least one of 6-(dodecyloxy)-N,N,N-trimethyl-6-oxohexan-1-aminium iodide having the following formula:

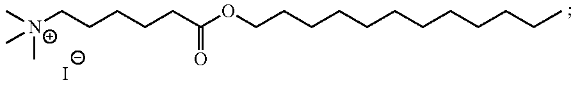 [SMILES: CCCCCCCCCCCCOC(=O)CCCCC[N+](C)(C)C ; [I-]]

6-(dodecyloxy)-dimethylamino hexanoate N-oxide having the following formula:

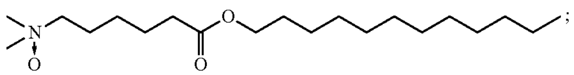 [SMILES: CCCCCCCCCCCCOC(=O)CCCCC[N+](C)(C)[O-]]

6-(dodecyloxy)-N,N-dimethyl-6-oxohexan-1-aminium chloride having the following formula:

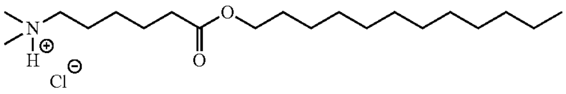

4-((6-(dodecyloxy)-6-oxohexyl)dimethylammonio)butane-1-sulfonate having the following formula:

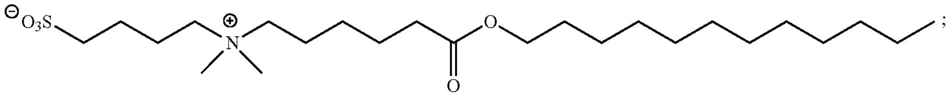

and combinations thereof; and at least one organic dry cleaning solvent.

13. The formulation according to claim 12, wherein the at least one organic dry cleaning solvent is at least one compound selected from the group consisting of perchloroethylene, hydrocarbons, trichloroethylene, decamethylcyclopentasiloxane, dibutoxymethane, n-propyl bromide.

14. The formulation according to claim 12, further comprising at least one co-solvent.

15. The formulation according to claim 14, wherein the at least one co-solvent is at least one compound selected from the group consisting of alcohols, ethers, glycol ethers, alkanes, alkenes, linear and cyclic amides, perfluorinated tertiary amines, perfluoroethers, cycloalkanes, esters, ketones, aromatics, methanol, ethanol, isopropanol, t-butyl alcohol, trifluoroethanol, pentafluoropropanol, hexafluoro-2-propanol, methyl t-butyl ether, methyl amyl ether, propylene glycol n-propyl ether, propylene glycol n-butyl ether, dipropylene glycol n-butyl ether, propylene glycol methyl ether, ethylene glycol monobutyl ether, trans-1,2-dichloroethylene, decalin, methyl decanoate, t-butyl acetate, ethyl acetate, glycol methyl ether acetate, ethyl lactate, diethyl phthalate, 2-butanone, N-alkyl pyrrolidone, methyl isobutyl ketone, naphthalene, toluene, trifluorotoluene, perfluorohexane, perfluoroheptane, perfluorooctane, perfluorotributylamine, perfluoro-2-butyloxacyclopentane.

* * * * *